(12) United States Patent
Joung et al.

(10) Patent No.: US 9,993,757 B2
(45) Date of Patent: Jun. 12, 2018

(54) FILTER CARTRIDGE ASSEMBLY

(71) Applicants: WhiDong Joung, Hwaseong-si, Gyeonggi-do (KR); MICROFILTER Co., Ltd, Chungcheongbuk-do (KR)

(72) Inventors: WhiDong Joung, Hwaseong-si (KR); JaeIk Lee, Cheongju-si (KR); PilKang Hwang, Jincheon-gun (KR)

(73) Assignee: MICROFILTER Co., LTD., Chungcheongbuk-do (KR)

( * ) Notice: Subject to any disclaimer, the term of this patent is extended or adjusted under 35 U.S.C. 154(b) by 197 days.

(21) Appl. No.: 15/072,030

(22) Filed: Mar. 16, 2016

(65) Prior Publication Data
US 2016/0271536 A1 Sep. 22, 2016

(30) Foreign Application Priority Data

Mar. 16, 2015 (KR) .......................... 10-2015-0036197

(51) Int. Cl.
*B01D 35/30* (2006.01)
*B01D 35/12* (2006.01)
(Continued)

(52) U.S. Cl.
CPC ........... *B01D 35/306* (2013.01); *B01D 27/00* (2013.01); *B01D 35/12* (2013.01); *B01D 35/147* (2013.01);
(Continued)

(58) Field of Classification Search
None
See application file for complete search history.

(56) References Cited

U.S. PATENT DOCUMENTS

| 8,097,157 B2 | 1/2012 | Tubby et al. |
| 8,137,551 B1 | 3/2012 | Huda et al. |
| 2011/0139698 A1 | 6/2011 | Freystedt et al. |

FOREIGN PATENT DOCUMENTS

| KR | 10-0873665 B1 | 12/2008 |
| KR | 10-1311654 B1 | 9/2013 |

*Primary Examiner* — Chester T Barry
(74) *Attorney, Agent, or Firm* — Jefferson IP Law, LLP

(57) ABSTRACT

A filter cartridge assembly is provided. The filter cartridge assembly includes a filter head having an inlet and an outlet, an inner moving up or down in the filter head by an elastic unit, and a locking/unlocking part to control the inner to be stopped in a state that the inner moves up and to move down in state that the inner is stopped such that a filter cartridge is detachably installed in the filter head through the up-down movement of the inner, wherein, in order to allow the inner, which moves up or down in the filter head, to linearly move up only to separate the filter cartridge and to prevent the filter cartridge from being arbitrarily separated when the inner moves down. The inner includes an inner main body, and a holder including a plurality of wing pieces, in which the holder formed on a lower end of the inner main body are provided with the wing pieces which are spaced apart from each other to operate inward and outward, respectively, when the inner moves up or down. Each of the wing pieces includes a protrusion for inducing the inner to be retracted inward while tightly making contact with an inner wall of the filter head when the inner moves up, and a holder protrusion formed at an opposite side of the protrusion to hold the filter cartridge. The protrusion of the wing piece releases an operation of the holder protrusion holding the filter cartridge in a state that the inner moves down, and the filter head is provided with an inner groove rim on a portion at which the protrusion is placed in the state that the inner moves down such that the protrusion is inserted into the inner groove rim to be latched to the inner groove rim, (Continued)

thereby preventing the inner from being arbitrarily separated from the filter head.

13 Claims, 26 Drawing Sheets

(51) Int. Cl.
    *B01D 35/147*     (2006.01)
    *B01D 27/00*     (2006.01)

(52) U.S. Cl.
    CPC .. *B01D 2201/302* (2013.01); *B01D 2201/305* (2013.01); *B01D 2201/4084* (2013.01)

FILTER CARTRIDGE ASSEMBLY

CROSS REFERENCE TO RELATED APPLICATION(S)

This application claims the benefit under 35 U.S.C. § 119(a) of a Korean patent application filed on Mar. 16, 2015 in the Korean Intellectual Property Office and assigned Serial number 10-2015-0036197, the entire disclosure of which is hereby incorporated by reference.

BACKGROUND OF THE INVENTION

1. Field of the Invention

The present invention relates to a filter head installed on a water purification line in which water is purified by using a filter and a filter cartridge assembly detachably attached to the filter head, and more particularly, to a filter cartridge assembly in which the filter cartridge is automatically detachable from the filter head by repeatedly pushing the filter cartridge in a vertical direction without any manipulation.

In addition, when the filter cartridge is detached by repeatedly pushing the filter cartridge, a bypass passage and a water purification passage are selectively formable.

2. Description of the Related Art

Currently, a single filter or plural filters may be used on a water purification line of a water purifier or a refrigerator required to purify water according to use. Such a filter is installed in a cartridge and the filter installed cartridge is frequently exchanged while being detachably attached to a filter head.

Thus, when the filter cartridge which is detachably installable to the filter head, is inserted into the filter head, a water purification passage is formed to purify water through a filter in the filter cartridge. If the filter cartridge is separated from the filter head, an inlet, which is formed in the filter head and connected to an external water supply line, is directly connected to an outlet through which the purified water is discharged so that a bypass function is formed to prevent water from leaking out from the filter head. If the bypass function does not exist, after the water supplied through the water supply line is blocked, the filter cartridge must be exchanged.

In general, it must be taken into consideration to fix the filter cartridge to withstand the water pressure transferred through the water supply line in a state that the filter cartridge is installed to the filter head, to prevent water from leaking from the water purification passage through which the inlet communicates with the outlet in a state that the filter head is installed, and to stabilize the communication of the bypass passage in the filter head in a state that the filter cartridge is separated from the filter head.

Therefore, in consideration of the above, when the filter cartridge is installed into the filter head, a locking unit requiring an additional manipulation (such as a rotation) is used to prevent the filter cartridge from being separated from the filter head after the filter cartridge is installed into the filter head. Since the locking unit is focused on the firm fixing of the filter, it may be difficult to exchange the filter cartridge to be frequently exchanged.

An automatic switching between the bypass passage and the water purification passage in detaching a filter cartridge has been disclosed in Korean Registered Patent No. 10-1311654.

In addition, a scheme of installing a filter cartridge by pushing the filter cartridge into a filter head while a bypass passage and a water purification passage automatically switch with each other had been disclosed in US Patent Application Publication No. 2011/0139698 A1 wherein, when a filter is fittingly pushed into and assembled with the filter head, a passage is formed on a side surface of the filter, so that a hydraulic pressure on the filter is reduced.

However, in this case, since the filter should be pulled to be separated from the filter head, it is difficult to assemble or disassemble the filter. In addition, in a state that the filter is assembled with the filter head, to prevent the filter from being arbitrarily separated from the filter head, even though a small hydraulic pressure is applied on the filter, an O-ring must be tightly closed to a sealing part while the filter is tightly fitted into the filter head. Due to such a structure, since great force is applied to assemble or disassemble the filter, it is difficult to assemble or disassemble the filter with the filter head. In addition, during the assembling or disassembling of the filter, the O-ring installed to the sealing part may be damaged.

In addition, a latching assembly assembled with a bracket, which moves toward one side when being pushed and returns to the original position when pressure thereon is removed, had been disclosed in U.S. Pat. No. 8,097,157 B2, where the latching assembly is elastically supported at both sides in a rotational direction by a spring, and a filter cartridge is assembled or disassembled while the latching assembly is rotated by the assembling and disassembling operation of the filter cartridge.

However, even in such a manner that the filter is assembled in such a rotating latch structure, the bracket and latching assembly are configured with several components to perform the rotational operation and the spring is necessarily required for elastic restoring force, so that the structure is complex.

In addition, a detaching scheme employing a structure of a rack type had been disclosed in U.S. Pat. No. 8,137,551 B1, wherein, since a rack structure is provided at a central portion of a filter cartridge between a supply flow passage and a discharge flow passage which are formed at left and right sides of the filter cartridge to be spaced apart from each other, such that an inlet and an outlet of a filter head communicate with each other in the filter cartridge, another spring must be used to operate the rack structure, and the supply flow passage and the discharge flow passage are spaced apart from each other, so that any bypass functions do not exist.

Therefore, because those described above are focused on stability in coupling rather than convenience in exchange, it is practically very difficult to exchange a filter.

DOCUMENT OF RELATED ART

Patent Document (Patent document 1) Korean Registered Patent No. 10-0873665 B1
(Patent document 2) Korean Registered Patent No. 10-1311654 B1

SUMMARY OF THE INVENTION

To solve the problems described above, one object of the present invention is to enable a filter cartridge to be coupled to or separated from a filter only by repeatedly and vertically pushing the filter cartridge after the filter cartridge is inserted into the filter head, and to simply implement a bypass passage when the filter cartridge is separated from the filter head and a water purification passage without receiving a water pressure when the filter cartridge is coupled to the filter head.

Another object of the present invention is to provide a structure of assembling a filter cartridge with a filter head, in which the separation direction of the filter cartridge is not specialized such that the filter cartridge may be easily manipulated to be coupled to or separated from the filter head.

To this end, an inner structure (hereinafter "inner") is provided to elastically move up and down in a filter head and select a bypass passage or a water purification passage. The inner includes an entrance part through which a filter cartridge may enter. While a front end of the filter cartridge is introduced through the entrance part, the filter cartridge primarily pushes the inner to allow the inner to move up so that the inner holds the filter cartridge to prevent the filter cartridge from being separated from the filter head. A locking/unlocking part is provided to stop the inner in the moving-up state in the filter head and to release the stop state of the inner by pushing again the filter cartridge, so that the inner moves down. When the state that the moving-up of the inner is stopped is released by the locking/unlocking part, the inner moves down and automatically releases the filter cartridge held during the moving-up of the inner.

In this case, a water purification passage is formed when the inner moves up and the moving-up state of the inner is stopped in the filter head by the locking/unlocking part. At the same time, the filter cartridge introduced into the inner is not separated from the filter head.

In the state that the water purification passage is formed by the primary pushing and locked, when a secondary pushing is performed, while the locked state is unlocked, the filter cartridge moves down, so that the filter cartridge is separable while a bypass passage is formed.

In addition, an inlet and an outlet are coaxially formed in the front end of the filter cartridge to form the water purification passage. When the inner moves up to hold the filter cartridge, the inserting direction of the filter cartridge is not specialized so that the filter cartridge may be held or released.

Thus, the inlet and outlet are coaxially formed in the front end of the filter cartridge so that the separation direction of the filter cartridge from the filter head is not specialized, thereby providing convenient manipulation. In addition, in case that the filter cartridge is installed to the filter head, the water purification passage is formed by primarily pushing the filter cartridge and at the same time, the filter cartridge is prevented from being arbitrarily separated from the filter head. In a state that the filter cartridge is locked by using the inner in a moving-up state of the inner, the filter cartridge is unlocked by secondarily pushing the filter cartridge with the inner, so that the filter cartridge is easily separated from the filter head while the bypass passage is formed. Therefore, the filter cartridge is easily assembled and unassembled with the filter head by simply repeating the pushing.

Since the filter cartridge is assembled and unassembled with the filter head through the inner, the water pressure is not directly transferred to the filter cartridge, so that the filter cartridge may be easily exchanged and there would be not more concerned about the damage of a coupling part, so the durability may be improved, a safety accident may be prevented and the quality may be improved.

In addition, the locking/unlocking structure of the filter head and the inner is simple and the components can be easily manufactured, so that the manufacturing cost may be reduced and the structure may be economical.

DETAILED DESCRIPTION OF THE INVENTION

Hereinafter, embodiments according to the present invention will be described in detail.

According to a basic operating structure of the present invention, when a filter cartridge, in which a filter is embedded and includes an inlet and outlet, is pushed into a filter head, the filter cartridge is coupled to the filter head while moving up. As described above, in the state that the filter cartridge moves up and is coupled to the filter head, while the filter cartridge is fixed to be prevented from moving down, a water purification passage is formed. In the state that the water purification passage is formed, when the filter cartridge is pushed once more again to exchange the filter, the water purification passage is deformed while the filter cartridge moves down. In this case, if it is possible to form a bypass passage, more excellent effect may be achieved. When the filter cartridge is unlocked to the filter head, the filter may be separated from the filter head.

An inner, which moves up or down while being prevented from being arbitrarily separated from the filter head, is installed in the filter head in order to allow the filter cartridge to move up or down in the filter head. In addition, the inner may include a unit which forms the water purification passage together with the filter head when the inner moves up and forms the bypass passage when the inner moves down, and a holder for holding the filter cartridge to allow the filter cartridge to be arbitrarily separated from the filter head when the filter cartridge moves up.

Therefore, as will be described in detail, the coupling and decoupling of the filter cartridge with the filter head are automatically implemented only by repeatedly pushing the filter cartridge. In addition, while the sealing is maintained, the filter cartridge may be prevented from being arbitrarily separated from the filter head.

Hereinafter, an embodiment of the present invention will be described in detail with reference to accompanying drawings.

Figure 1:
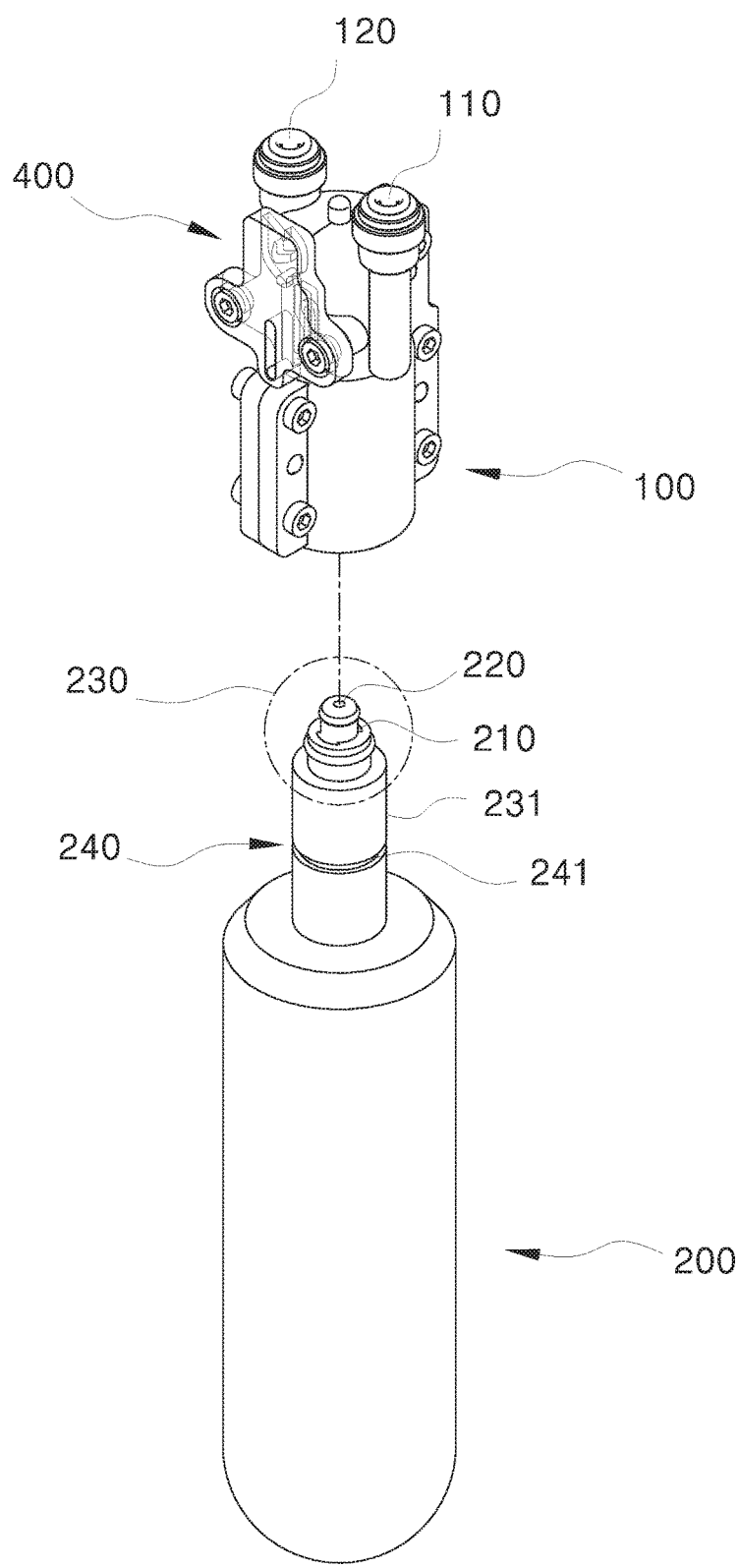
FIG. 1 is an exploded perspective view showing a filter head and a filter cartridge according to the present invention.

FIG. 1 shows a state that a filter cartridge is separated from a filter head and a filter cartridge according to one embodiment of the present invention.

The filter head 100 includes an inlet 110 connected to an external water supply line (not shown), an outlet 120 for discharging purified water passing through a filter (not shown) embedded in the filter cartridge 200, and a locking/unlocking part 400 for stopping the filter cartridge 200 when the filter cartridge 200 installed into the filter head 100 moves up and for releasing the stopped filter cartridge to allow the filter cartridge to move down.

A front end 230, in which the inlet 210 and the outlet 220 of the filter cartridge 200 are coaxially formed, may be introduced into the filter head 100 as described below. In this case, a latching element 240 is provided to fix the filter cartridge 200 to the filter head 100 when the filter cartridge 200 is pushed to move up.

When the filter cartridge 200 is introduced into the filter head 100 to be coupled to the filter head 100, the latching element 240 according to the present invention may hold a contact surface 231 at an lower end of the front end 230 while pressing the contact surface 231 such that the filter cartridge 200 is fixed to the filter head 100 while the filter cartridge 200 is inserted into the filter head 100 without any specific directionality. Alternatively, the latching element 240 may be implemented in a formed of a latching rim 241 which is latched at a particular position of the contact surface 231. Alternatively, the latching element 240 may be implemented as a concavo-convex surface (not shown) formed on the contact surface 231 to hold the filter head 100.

In the embodiment of the present invention, although the latching rim 241, which is proposed as an example of the latching element 240 for preventing separation of the filter cartridge 200 caused by unintentional moving-down of the filter cartridge 200 from the moving-up state, may include the concavo-convex surface for pressing the contact surface 231 or for increasing friction and latching action when pressing the contact surface 231, this is illustrative purpose only and the present invention is not limited thereto. The latching element 240 may be modified in various forms through substitutions of equivalents for the same purpose.

Figure 2:
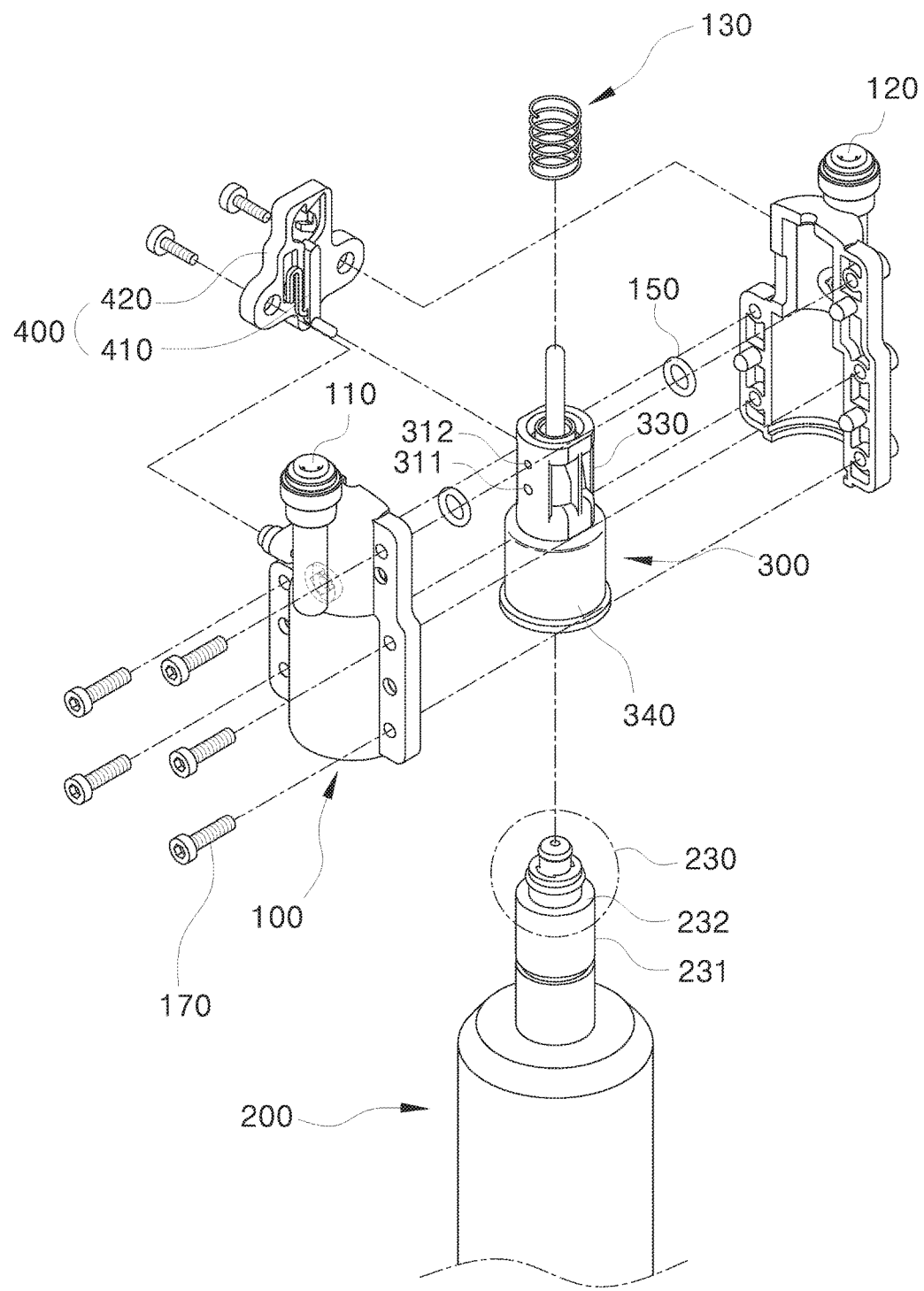
FIG. 2 is a perspective view showing the assembly of a filter head and an inner according to the present invention.

FIG. 2 shows one example of an installing state of the inner which forms the water purification passage and the bypass passage while guiding the filter cartridge when the filter cartridge inserted into the filter head of the present invention is pressed to move up.

As shown in FIG. 2, the filter head 100 is divided into two parts such that the inner 300 is easily assembled with the filter head 100. In a state that the inner 300 is installed into the filter head 100, the inner 300 may be assembled with the filter head 100 by using a coupling unit 170 while being engaged with the filter head 100. Although the screw coupling scheme is employed in the embodiment of the present invention, the embodiment is not limited thereto.

As shown in the drawings, the coupling unit 170 may include a screw coupling. The coupling unit 170 may include welding by heat, a high-frequency or ultrasonic wave or may include a hook coupling.

Figure 4:
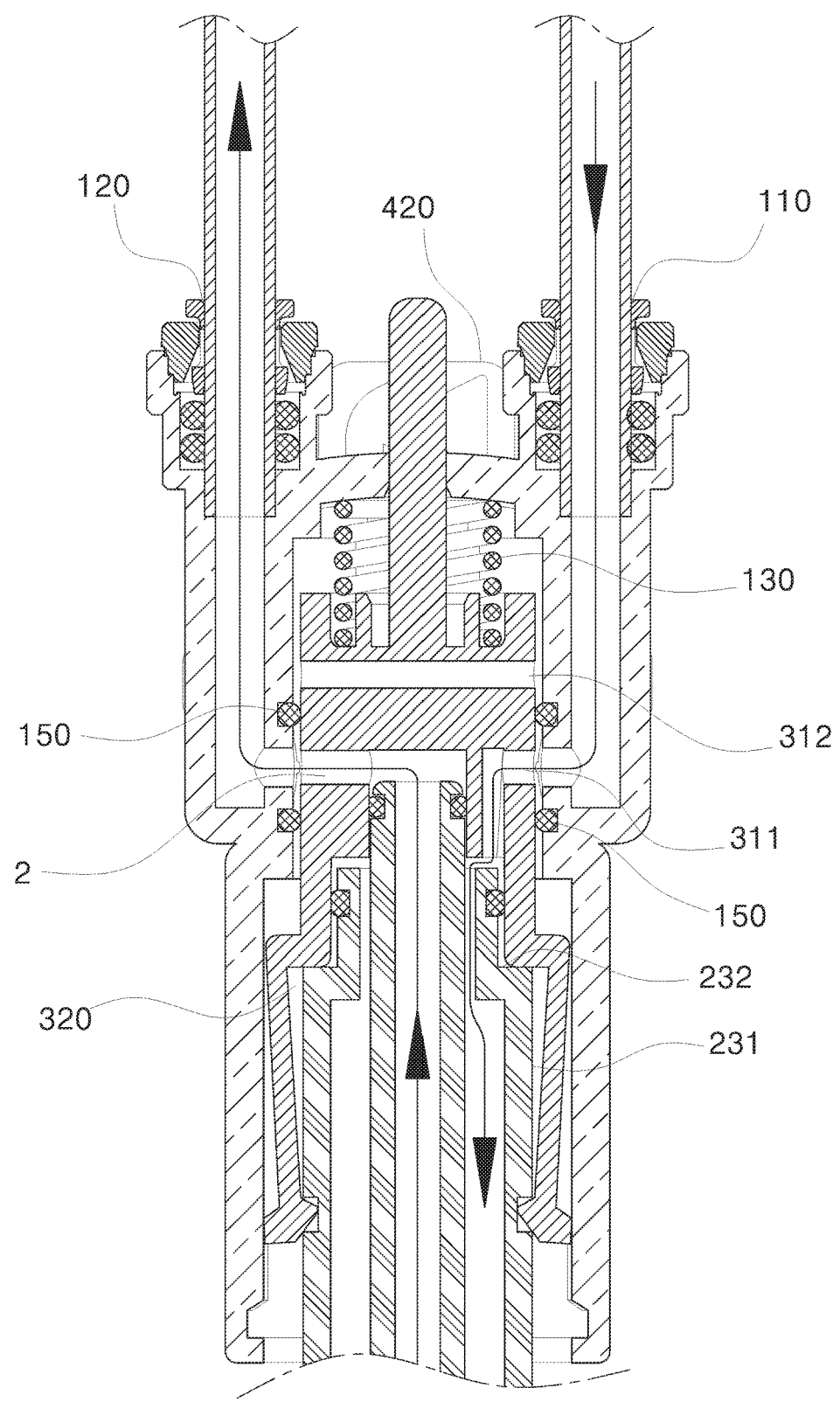
FIG. 4 is a sectional view showing a water purification passage in a state that the inner, which is installed to move up or down by the filter head, pushes up the filter cartridge according to the present invention.
Figure 5:
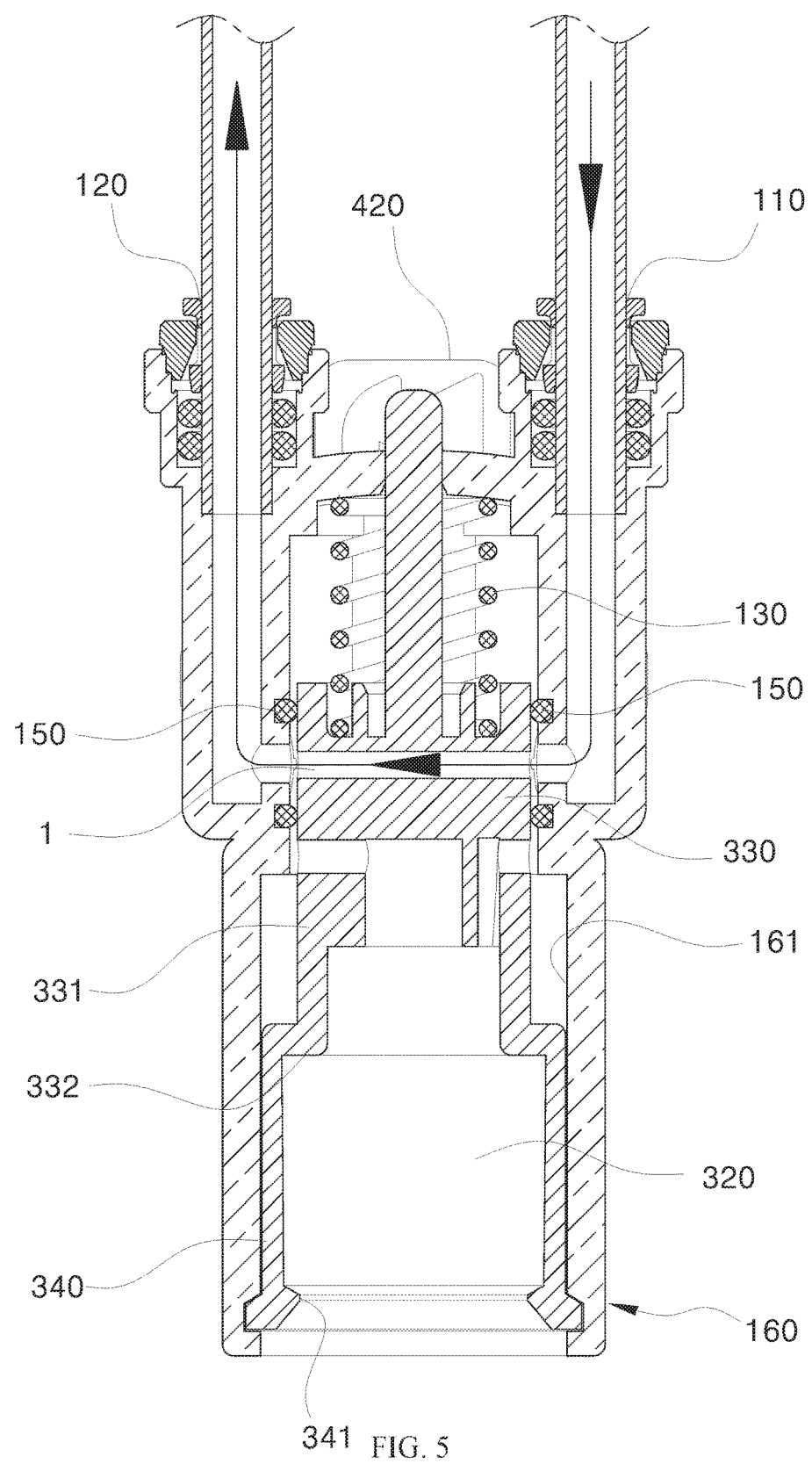
FIG. 5 is a sectional view showing a bypass passage in a state that the inner, which is installed to move up or down by the filter head, moves down according to the present invention.

In addition, the inner 300 installed in the filter head 100 includes an inner main body 330 and a holder 340 for holding or releasing the filter cartridge 200 when the inner moves up or down. As shown in FIGS. 4 and 5 which will be described below, the inner 300 includes an entrance part 320 through which the front end 230 and latching element 240 of the filter cartridge 200 are introduced into the inner 300.

In this case, the inner 300 may move up or down in the filter head 100. In the state that the inner 300 moves up, an elastic member 130 is pressed so that the inner may rapidly move down by the restoring force of the elastic member 130. Thus, since the moving-up or down of the inner 300 is elastically maintained, the inner 300 may easily move up or down and the filter cartridge 200 may be enabled to be easily coupled or decoupled.

In addition, as shown in FIGS. 2 and 4 to 6, the holder 340 including a wing piece provided on a lower end of the inner main body 330 may be formed integrally with the inner main body 330. Alternatively, as shown in FIGS. 3, 8, 9, 17 and 18, the holder 340 may be implemented in a separable type so that the holder 34 is assembled with the inner main body 330.

However, when the inner 300 moves up in the filter head 100, the wing pieces of the holder 340 retracts inwardly while being tightly closed to an inner wall of the filter head 100, so that the inner 300 holds the filter cartridge 200, so the filter cartridge 200 may be prevented from being arbitrarily separated from the filter head 100. In the state that the inner 300 moves down, the filter cartridge 200 is automatically separated from the filter head 100 while the retraction of the wing pieces is released.

Figure 3:
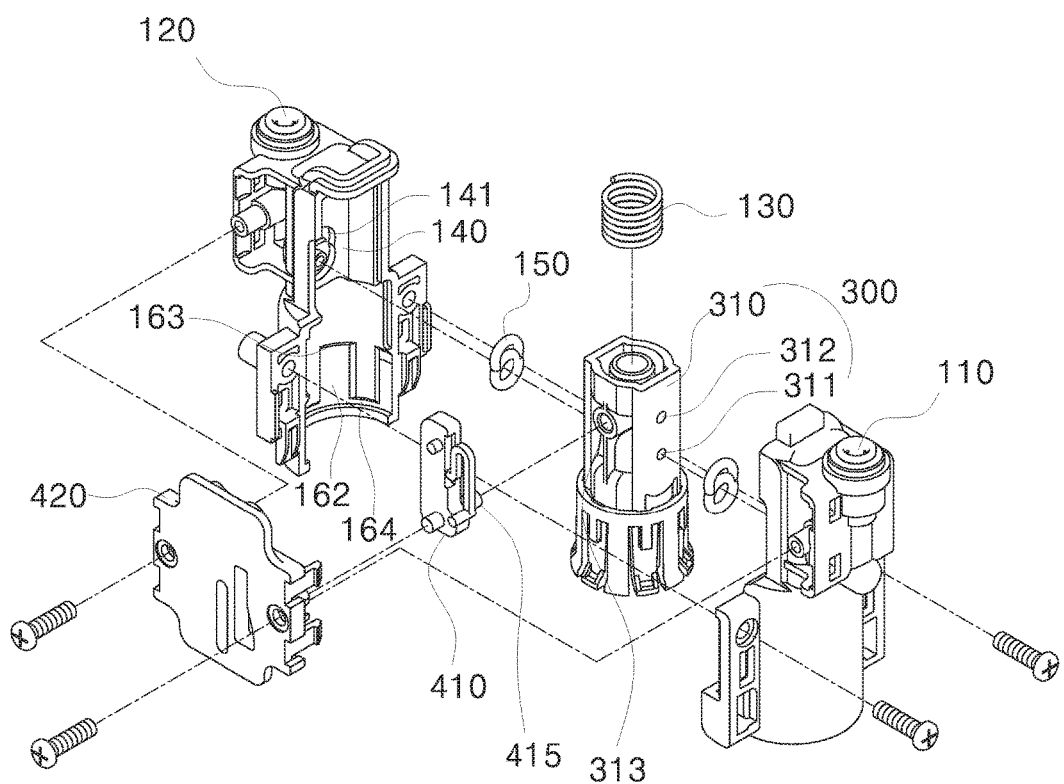
FIG. 3 is a view showing an inlet and an outlet of the filter head connected to the inner according to the present invention.

FIG. 3 is a view showing another example of the inner shown FIG. 2, where the inlet and outlet provided to the filter head are connected to the inner installed into the filter head to be movable up or down so that a structure of maintaining a sealing is formed when the bypass passage or water purification passage is selected, and an operating part constituting the locking-unlocking part is connected to the inner and an operation inducing part.

As described in the drawings, the inner 300 includes the inner main body 330 and the holder 340. The inner main body 310 is provided on an outer wall 310 thereof with a water purification passage hole 311 and a bypass passage hole 312. An inner entrance surface 141 is formed on an inner wall 140 of the filter head 100 to which the outer wall 310 of the inner 300 moving up or down is tightly closed. A packing ring 150 for maintaining a sealing is installed onto the inner entrance surface 141. In the state that the packing ring 150 is installed onto the inner entrance surface 141, the outer wall 310 of the inner 300 moves up or down while being tightly closed to the inner wall 140 of the filter head 100, so that the packing ring 150 may be prevented from being separated and the sealing may be maintained.

FIG. 2 shows O-rings which are installed to the inlet and outlet as the packing ring 150, respectively such that the sealing is maintained when the water purification passage hole 311 or the bypass passage hole 312 is selected by the moving-up or down of the inner 300. FIG. 3 shows one O-ring used as the packing ring 150 for the inlet and outlet instead of the two O-rings which are installed to the inlet and outlet, respectively so that the one O-ring exhibits the same effect as the two O-rings.

Thus, in the state that the inner 300 moves up such that the filter cartridge 200 is installed to the filter head 100, when the water purification passage 2 or the bypass passage 1 is formed, it is possible to maintain the sealing.

Figure 8:
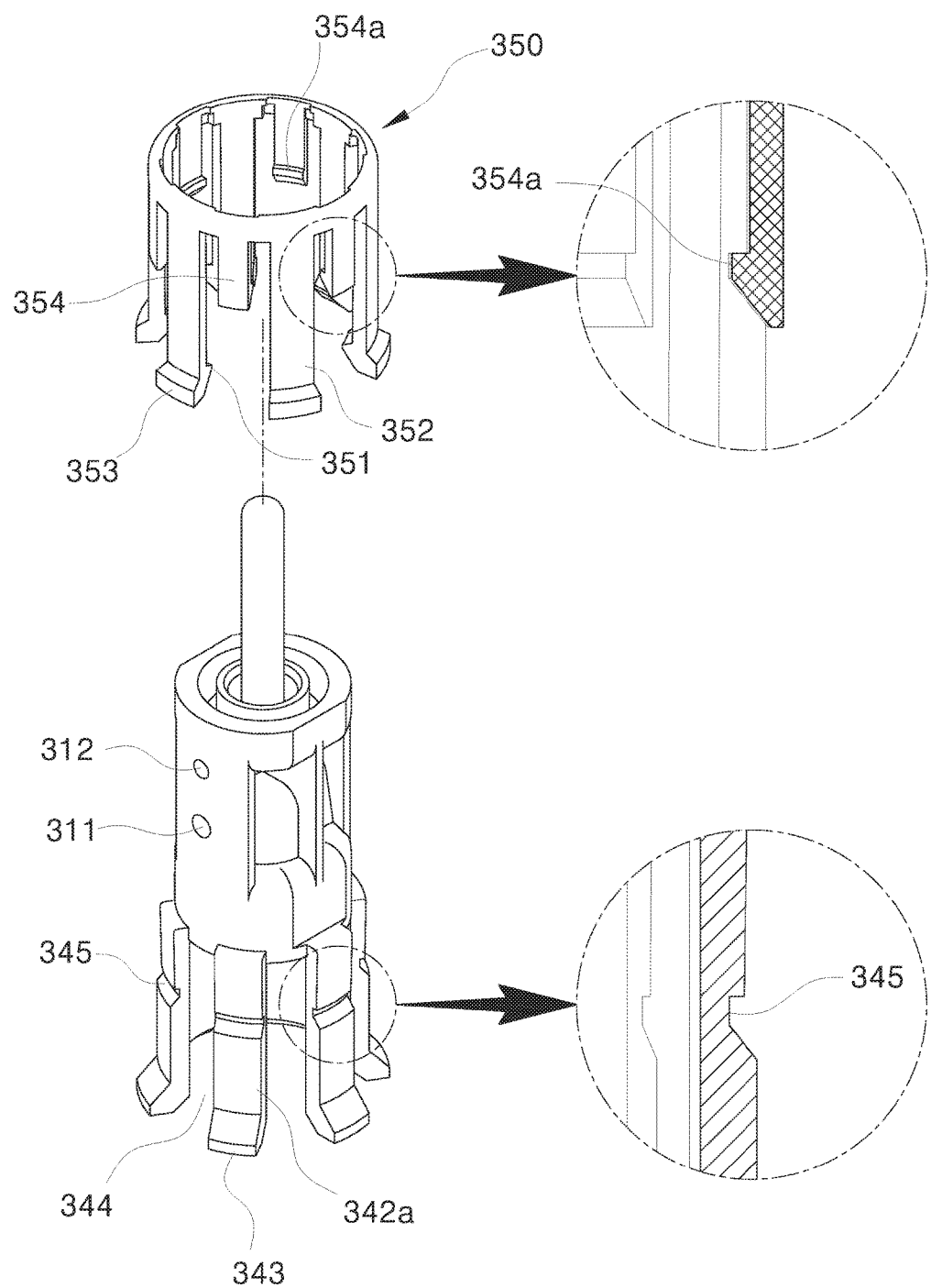
FIG. 8 is a perspective view showing a holder of the inner according to still another embodiment of the present invention.
Figure 9:
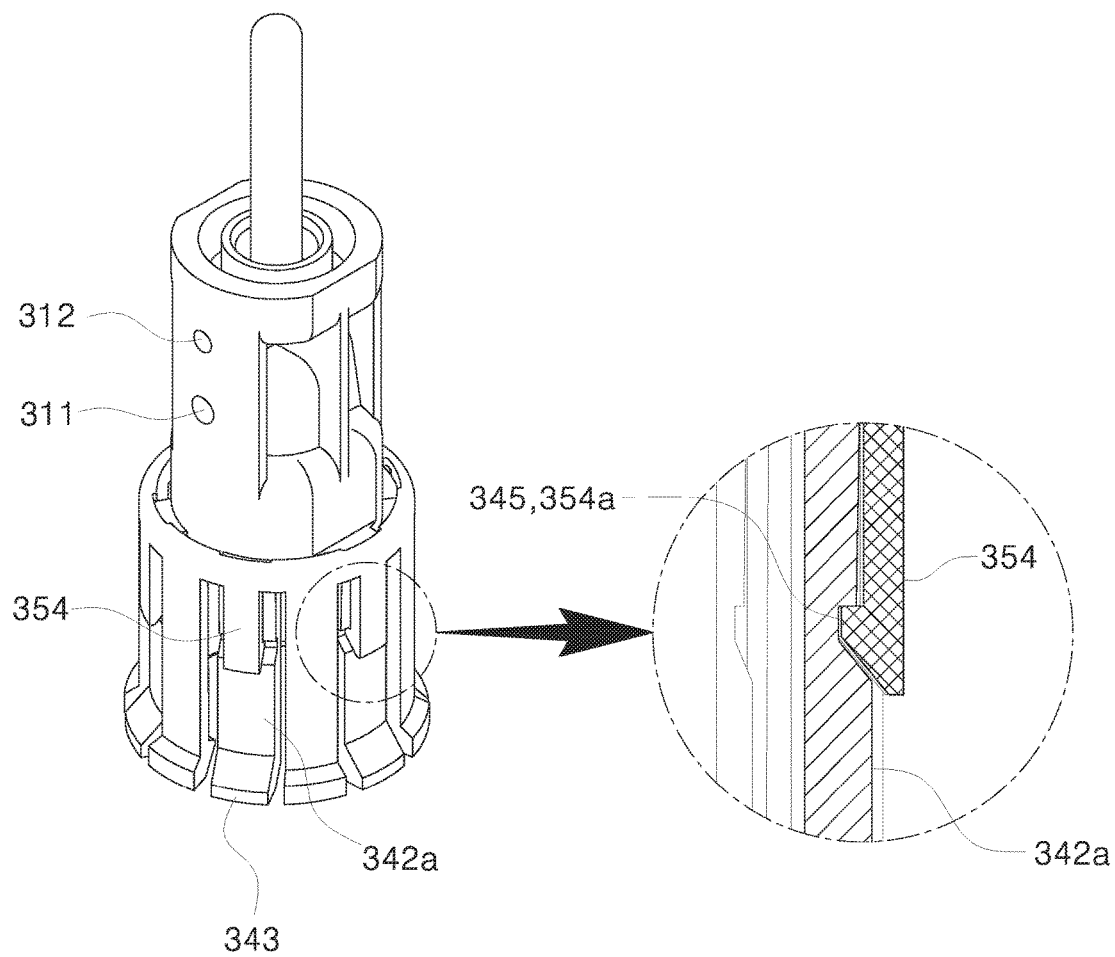
FIG. 9 is an assembly view of FIG. 8.

Furthermore, FIGS. 3, 8 and 9 show a structure of assembling the holder 340 including wing pieces with the inner main body 330 constituting the inner 300. The plurality of wing pieces 342a are provided to the inner main body and the holder includes coupling wing pieces coupled to the wing pieces and operating wing pieces 352 placed at opening part between the wing pieces spaced apart from each other. The holder is assembled with the inner main body to hold the filter cartridge 200 when the inner moves up or down. The pieces have excellent molding property such that they may be formed through an injection molding scheme.

The assembly structure of the holder 340 which includes the latching wing pieces and operating wing pieces coupled to the wing pieces 342a and the operation of the holder 340 which holds or releases the filter cartridge 200 while the inner 300 moves up or down will be described in detail below.

According to the embodiment, the inner 300 is elastically supported by the elastic member 130 in a state that the inner 300 is installed into the filter head 100, such that the inner 300 is prevented from being arbitrarily separated from the filter head 100 when the inner moves up or down. As shown in FIGS. 4 and 5, when the inner 300 moves up, protrusions 343 protruding outward of the wing pieces are formed to allow the wing pieces to retract inward while the wing pieces 342 and 342a of the holder 340 constituting the inner 300 is tightly closed to an inner wall of a cap part of the filter head 100, so that the wing pieces of the holder retract inward. As the wing pieces of the holder retract inward, the wing pieces hold the latching element 240 of the front end of the filter cartridge introduced through the entrance part of the inner. When the inner moves down, the protrusions of the wing pieces of the holder, which are in the retraction state due to the moving up of the inner, are inserted into the inner groove rim 163 formed on a lower end of the inner wall of the cap part of the filter head, so that the retracted wing pieces return to the original states. Then, the wing pieces are separated from the latching element 240 of the filter cartridge so that the filter cartridge 200 is separated from the inner 300 and at the same time, the protrusions of the wing pieces are inserted into the inner groove rim 163 so that the inner 300 is latched to prevent the filter cartridge from moving down, so the filter cartridge is prevented from being arbitrarily separated from the filter head.

According to the present invention, as the inner moves down, the protrusions 342 are inserted into the inner groove rim 163, so that the filter cartridge is easily introduced into the entrance part of the holder.

Meanwhile, as shown in FIGS. 2 and 3, a movable plate 411 constituting the operating part 410 of the lacking/unlocking part 400 which simultaneously moves up or down when the inner moves up or down is movable left or right due to the assembling of an inserting protrusion 415 formed on the movable plate 411 and an inserting groove 311 formed in the inner 300, so that the movable plate 411 may simultaneously move up or down together with the inner. In the state that the inner 300 moves up, the inner 300 may be prevented from arbitrarily moving down and in addition, it may be supplemented to prevent the inner 300 from being separated from the filter head 100.

FIGS. 4 and 5 show the water purification passage formed in the state that the inner movably installed to the filter head is primarily pushed through the filter cartridge to move up, the bypass passage formed in the state that the inner is secondarily pushed through the filter cartridge to move down, and the operating state of the holder 340 including a plurality of wing pieces 342 and constituting the inner 300.

As described above, the inner 300, in which the entrance part 320 into which the front end 230 of the filter cartridge 200 is input is formed, is movably installed into the filter head 100. The arbitrary separation prevention in the state that the inner is installed into the filter head, the stop in the state that the inner moves up in the filter head and the releasing of the stop state to allow the inner to move down are implemented as shown in FIGS. 3 to 5. That is, the inner 300 is prevented from being separated from the filter head 100 by the protrusions 343 of the wing pieces of the holder constituting the inner and the inner groove rim 163. In addition, the locking/unlocking part 400 operates such that the inner 300 is stopped in the state that the inner 300 moves up and the inner 300 is released to move down in that the inner 300 is stopped, so the locking/unlocking part 400 supplements the connection and the separation prevention.

As shown in FIGS. 4 and 5, the inner 300 includes the inner main body 330 which has the water purification passage 2 which is formed when the inner 300 into which the front end 230 of the filter cartridge 200 is inserted is pushed by the filter cartridge 200 to be move up or the bypass passage 1 formed when the inner 300 moves down, and the holder 340 including the wing pieces formed on the lower end of the inner main body 330 and separated from each other which operate inward or outward to hold the filter cartridge 200 such that the filter cartridge 200 is prevented from being arbitrarily separated from the inner in the state that the filter cartridge 200 moves up.

According to the holder 340 including the wing pieces, when the filter cartridge 200 is introduced into the entrance part 320 of the inner 300, the O-rings 211 and 221 installed to the inlet 210 and outlet 220 provided in the front end 230 of the filter cartridge 200 is tightly closed to the inner wall of the head 331 of the inner main body 330. In the state that the contact surface 231 of the front end 230 is tightly closed to the wing pieces of the holder 340, when the filter cartridge 200 is pushed to move up, the upper end sill 232 of the filter cartridge 200 is tightly closed to the lower end sill 332 of the inner, so that the filter cartridge does not move up anymore and as shown in FIG. 4, the water purification passage 2 is formed. At the same time, the wing pieces of the holder are retracted inward by the protrusions 343 of the wing pieces while moving up along the inner wall 101 of the filter head 100, so that the holder protrusions 341 provided on the holder 340 hold the filter cartridge 200 while being latched to the latching rim 241 proposed as one example of the latching element 240. In addition, the inner which moves up by the primary pushing is locked by the locking/unlocking part 400 so that the inner is fixed in the moving-up state. Until the fixed inner 300 moves down by the secondary pushing operation of the filter cartridge 200, the filter cartridge 200 may be prevented from being arbitrarily separated from the inner 300 due to the wing pieces of the holder 340 constituting the inner 300.

Although not shown, according to various embodiments of the holder holding the filter cartridge, the holder is prevented from being arbitrarily separated from the filter cartridge in the state that holder moves up while pressing the contact surface of the front end of the filter cartridge. An elastic surface is formed on the contact surface 232 or is added onto the holder, so that the holder may be prevented from sliding on the filter cartridge when the holder holds the filter cartridge, thereby increasing the coupling strength. In addition, a concavo-convex surface is additionally formed on the contact surface and a corresponding concavo-convex surface engaged with the concavo-convex surface is formed on the holder, so that the slide prevention may be more supplemented, thereby increasing the coupling strength.

However, the disclosure is described with reference to exemplary embodiments, but the embodiment is not limited thereto.

FIGS. 3, and 6 to 9 show the holder constituting the inner and including the wing pieces which are operated when the inner moves up, where, as the filter cartridge moves up, the holder protrusion is latched to or unlatched from the latching element of the filter cartridge according to the operating state and the operation of the wing pieces, so that the inner certainly holds the filter cartridge or the filter cartridge is released from the inner.

As shown and described above, the inner 300 includes the inner main body 330 and the holder 340 including the wing pieces. The holder 340 includes at least two wing pieces 342 spaced apart from each other at the lower end of the inner main body 330 in order to induce the wing pieces of the holder 340 to stably operate. The wing piece 342 has the length as that of the latching element 240 formed on the front end of the filter cartridge 200 in the state that the filter cartridge 200 is inserted into the entrance part 320 of the inner 300. When the upper end sill 332 of the filter cartridge 200 is tightly closed to the lower end sill 332 of the inner head 330, the holder protrusion 341 formed on the holder 340 is placed to be latched to the latching element 240 from on the contact surface 231 of the front end 230 of the filter cartridge 200.

In addition, the holder protrusion 341 is not latched to the latching unit 240 until the filter cartridge 200 is inserted into the entrance part 320 of the inner 300 and primarily pushed to move up.

In order for the holder protrusion 341 to be latched to the latching unit 240 of the filter cartridge 200 when the inner moves up, the protrusion 343 is formed at an outside of the wing piece 342 to correspond to the holder protrusion 34 formed at an inside of the wing piece 342. When the inner 300 moves up, the protrusion 343 moves up on the inner wall 161 of the cap part 160 of the filter head 100 and protrudes while retracting inward of the entrance part 320 of the inner 300.

Thus, the filter cartridge 200 is easily introduced into the entrance part 320 of the inner 300 until the filter cartridge moves up. In this case, when the inner 300 moves up by primarily pushing the filter cartridge, while the protrusion 343, which protrudes from an outside of the wing piece 342 constituting the holder 340 of the inner 300, is retracted inward by the inner wall 161 of the cap part 160 of the filter head 100, the holder protrusion 341, which protrudes inward from the wing piece, is smoothly inserted into the latching element 240 of the filter cartridge 200 to hold the filter cartridge 200.

The protrusion 343, which is formed on an the outside of the wing piece 342 constituting the holder, is normally inserted into the inner groove rim 163 formed on the lower end of the cap part 160 of the filter head 100 so that the protrusion 343 is not operated, so the front end 230 of the filter cartridge is easily introduced. Since the protrusion 343 is inserted into the inner groove rim 163 formed on the lower end of the cap part 160 of the filter head 100 so that the protrusion 343, even though the inner 300 is elastically supported by the spring in the state that the inner 300 is coupled to the inside of the filter head, the inner is prevented from being arbitrarily separated from the filter head.

Figure 6:
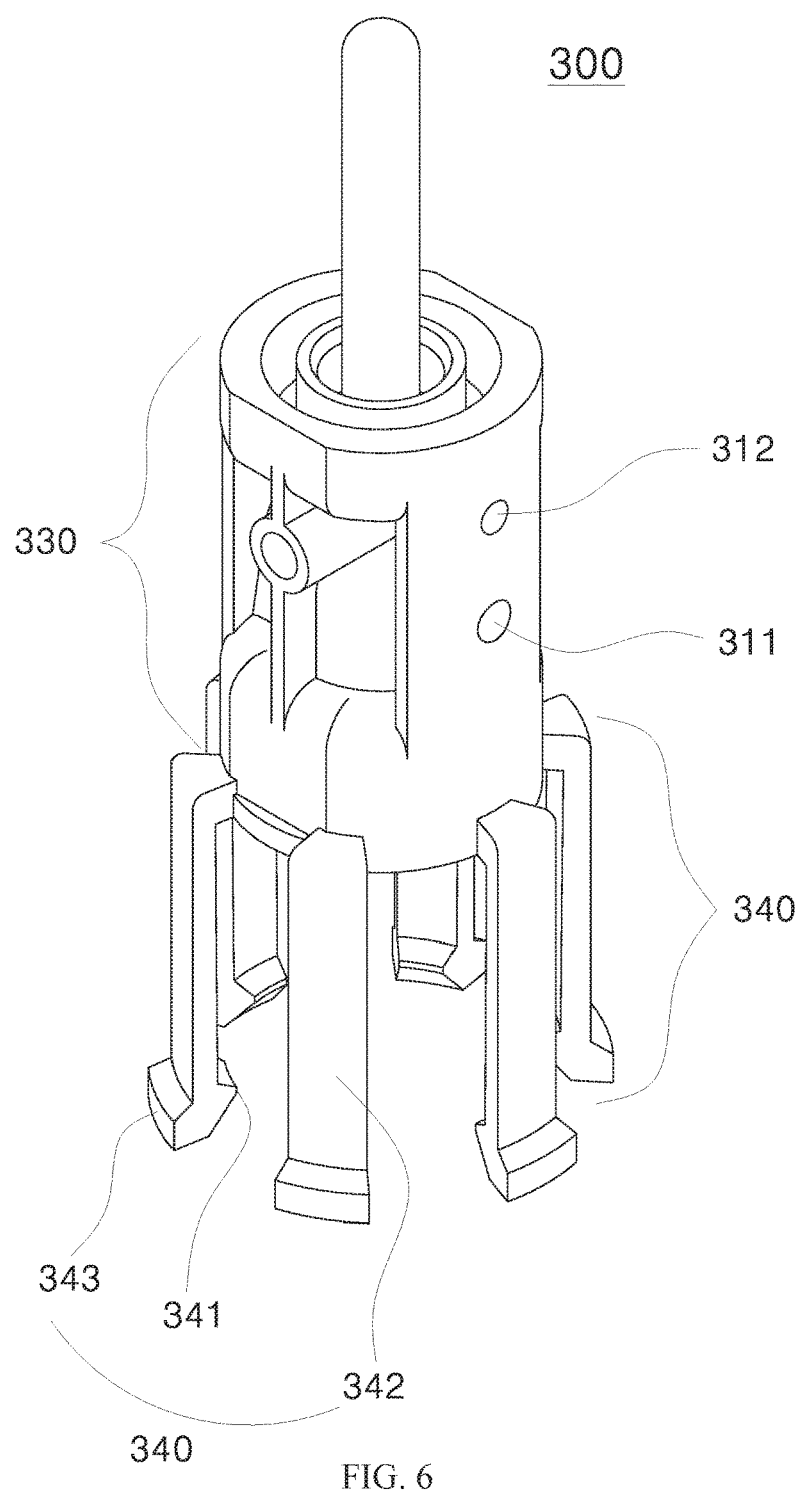
FIG. 6 is a perspective view showing an appearance of a holder of the inner according to one embodiment of the present invention.
Figure 7:
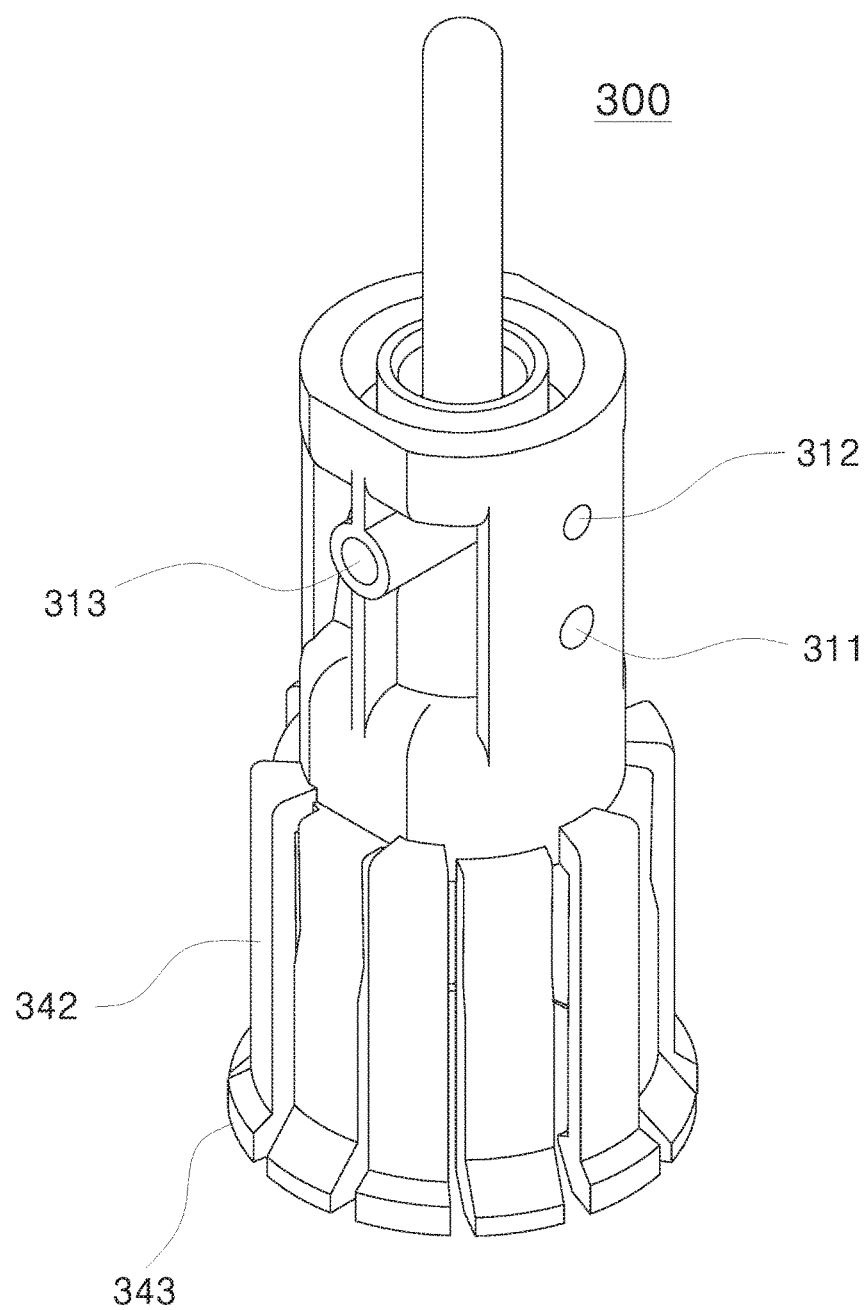
FIG. 7 is a perspective view showing a holder of the inner according to another embodiment of the present invention.

As shown in FIG. 6, the holder 340 includes at least two wing pieces, each of which has the protrusion 343 protruding outward thereof and the holder protrusion 341 protruding inward thereof. The wing pieces are spaced apart from each other by a predetermined interval so that opening parts are formed between the wing pieces. As shown in FIG. 7, the wing pieces 343 may be closely formed while being spaced apart from each other.

As shown in FIG. 2, through an insert molding scheme, the wing pieces of the holder, each of which has the protrusion 343 and the holder protrusion (not shown), are formed of a hard material and the remaining parts of the holder are formed of a soft material. When the inner 300 moves up, each wing piece (not shown in FIG. 2) molded of a hard material is retracted inward of the entrance part 320 of the inner 300 by the protrusions 343 of the wing pieces (not shown in FIG. 2), so that the holder protrusion formed on the inside of the hard wing piece is latched to the latching element 240 of the filter cartridge.

The holder provided on the lower end of the inner main body and having the wing pieces is for the purpose of illustrating an embodiment and the embodiment and objects of the present invention are not limited thereto.

As shown in FIGS. 6 and 7, in case that the inner 300 includes the inner main body 330 and the holder 340 including wing pieces, when the wing pieces 342 of the holder 340 are formed each to have the protrusion 343 tightly closed to the inner wall 161 of the cap part 160 and the holder protrusion 341 latched to the latching element 240 of the filter cartridge 200 as described above, it is difficult to integrally injection-mold the inner main body 330 and the holder in the state that the protrusion 343 and the holder protrusion 341 correspond to each other on the wing piece 342 (although a slide mold must be used to open the mold due to the protrusion and the holder protrusion, it is difficult to secure a space for allowing the mold to slide on the entrance part 320 of the inner main body 330). To solve the problem, as shown in FIG. 8, after a wing member 350 having operating wing pieces 352 is separately molded, the wing member 350 is assembled with the wing pieces 342a constituting the holder 340 of the inner 300, so that the injection molding and assembly may be easily performed.

To this end, according to an embodiment, the protrusions may be formed only at outsides of the wing pieces 342a constituting the holder 340 formed on the lower end of the inner main body 330, or not formed at all. If possible, the holder protrusion is not formed inward.

That is, when the holder protrusion is formed inward, due to the configuration of the inner main body, it is difficult to open the mold.

Thus, it is preferable not to form the holder protrusion inward. In addition, it is preferable to form an opening part 344 between the wing pieces 342a to allow the wing pieces 342a to be spaced apart from each other by a predetermined interval.

The reason is because, when the wing member including the operating wing pieces to be separately assembled is assembled, the operating wing pieces must be placed at the opening part 344.

In addition, the protrusion 353 is formed outward on the front end of the operating wing piece placed at the opening part and the holder protrusion 351 is formed inward.

Since the top end of the wing member 350 is opened, even though the protrusion 353 and the holder protrusion 351 are formed inward and outward of the front end of the operating wing piece 352, respectively, it may be easy to open the mold.

In addition, even when the wing piece 342a constituting the holder 340 of the inner assembled with the wing member 350 and the protrude 343 protrudes only outward, the mold is easily opened so that the molding is easily performed. It should be understood the protrusion 343 is not a necessary element.

Thus, before the wing member 350 is assembled, when the wing pieces 342a of the holder 340 constituting a part of the inner 300 are molded, it is easy to open the mold (that is, even when a slide mold is used, the space required to form the latching groove 345 formed on the wing piece 342a or the water purification passage hole 311 or the bypass passage 312 formed in the inner main body 330 may be secured), so that the injection molding may be easily performed.

When the wing pieces 342a constituting the inner 300 is assembled with the wing member 350, in order to prevent the wing member 350 from being arbitrarily separated from the inner main body 330 constituting the inner, a latching wing piece 354 is separately formed between the operating wing pieces 352 constituting the wing member 350. When the wing member 350 is coupled to the holder 340, the latching wing piece 354 is coupled to the wing piece 342a of the holder while being latched into the latching groove 345, so that the wing member 350 is prevented from being arbitrarily separated from the wing piece 342a.

In this case, a latching hook 354a is formed on the front end of the latching wing piece 354, so that the wing member 350 is coupled to the holder 340 of the inner main body 330 to prevent the wing member 350 from being arbitrarily separated from the holder 340 while the latching hook 354a is latched into the latching groove 345 formed on the wing piece 342a of the holder 340, thereby easily performing the molding and assembly.

In addition, as shown in FIG. 8, the protrusions 343 are formed at the opposite sides to the wing pieces 342a constituting the holder 340 in order to allow the holder 340 to be tightly closed to the contact surface 231 formed on the lower end of the front end of the filter cartridge 200 when the front end 230 of the filter cartridge 200 is inserted into the inner 300 in the state that the wing member is assembled with the holder of the inner. In this case, as shown in FIG. 3, a rail groove 162 is vertically formed on the inner wall 161 of the filter head to which the protrusion 343 is tightly closed, so that the wing piece 342a is maintained to be tightly closed to the contact surface 231 of the front end 230 of the filter cartridge while the wing piece 342a is not operated when the inner 300 moves up. When the inner 300 moves up, the operating wing piece 352 of the wing member 350, which is assembled with a part in which the rail groove 162 is not formed, is tightly closed to the inner wall 161 of the cap part 160 by the protrusion 353 formed on the operating wing piece 352, so that the holder protrusion 351 is retracted toward the entrance part 320. In this case, the holder protrusion 351 of the operating wing piece 352 may be latched with the latching element 240 formed on the lower end of the contact surface 231 of the filter cartridge 200, which is inserted into the entrance part 320 while being tightly closed to the entrance part 320.

Figure 10:
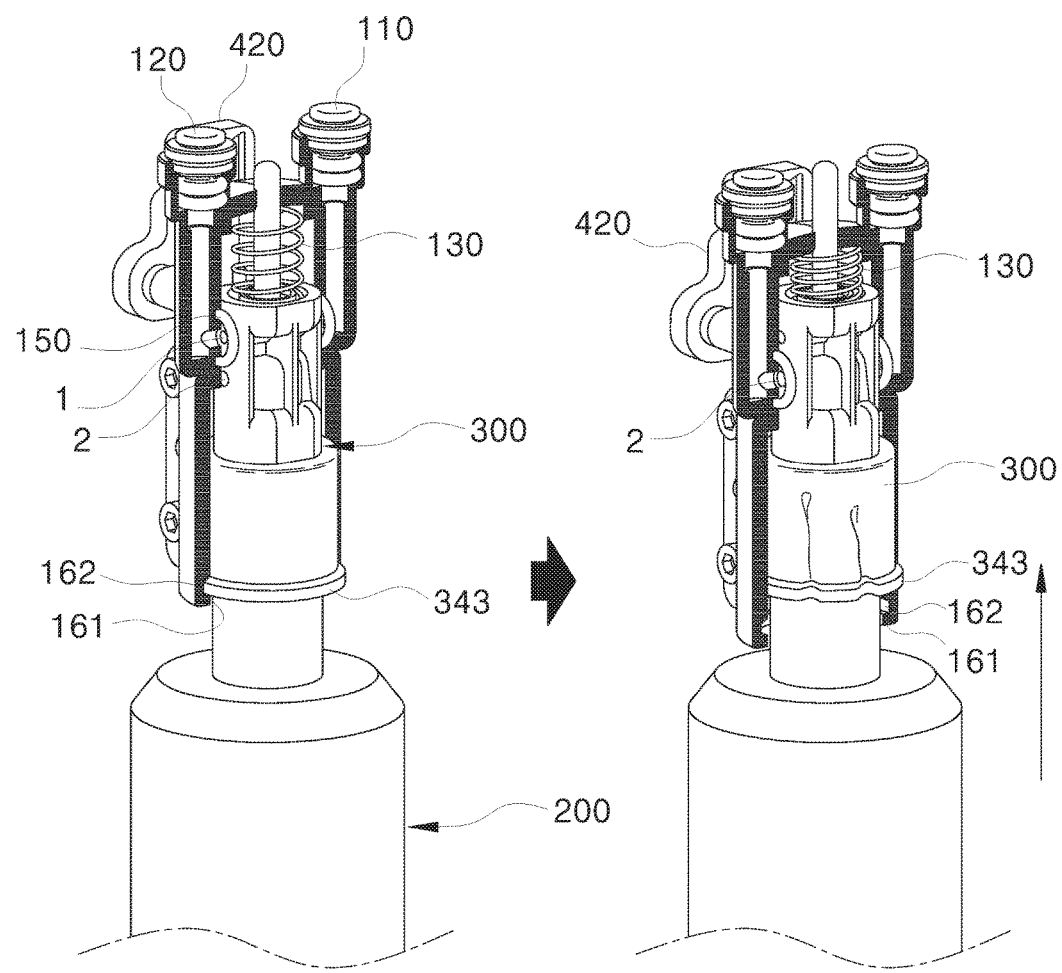
FIGS. 10 and 11 are views illustrating a state that a protrusion of an integrated holder of the inner is inserted into an inner groove rim and then, the holder is operated by the moving-up of the inner.
Figure 11:
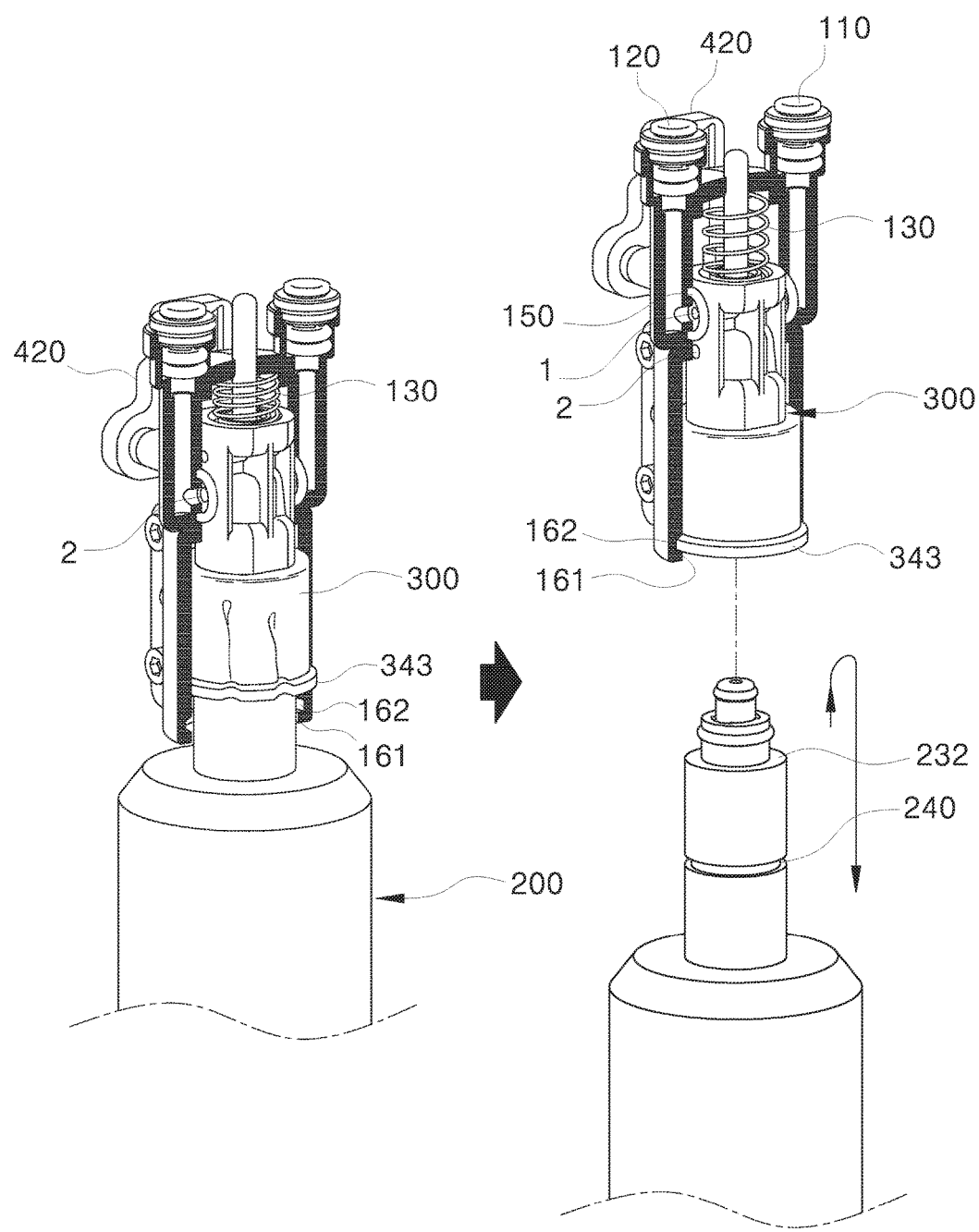
Figure 12:
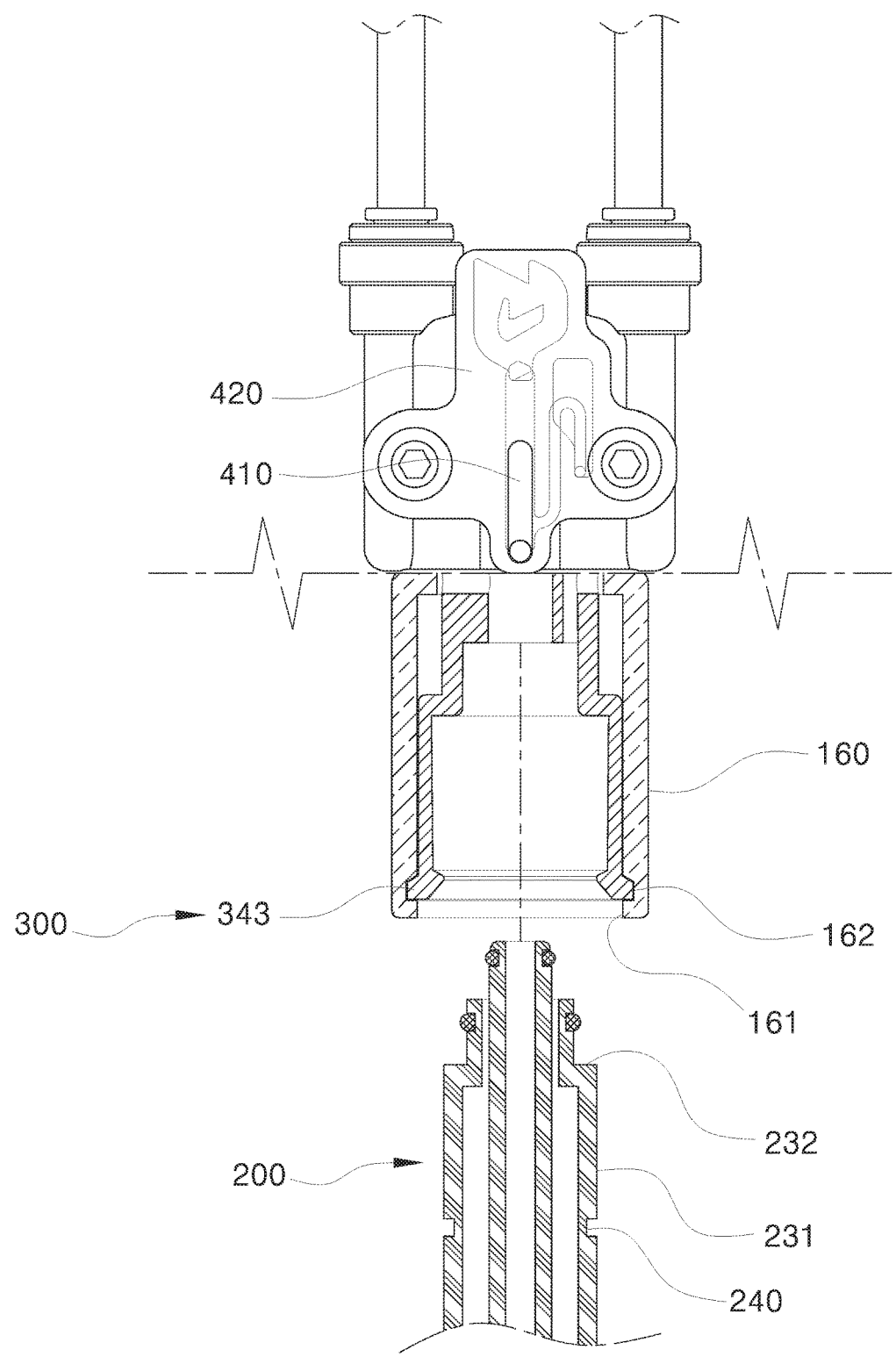
FIGS. 12 to 16 are views illustrating operation states of the holder according to the present invention.
Figure 13:
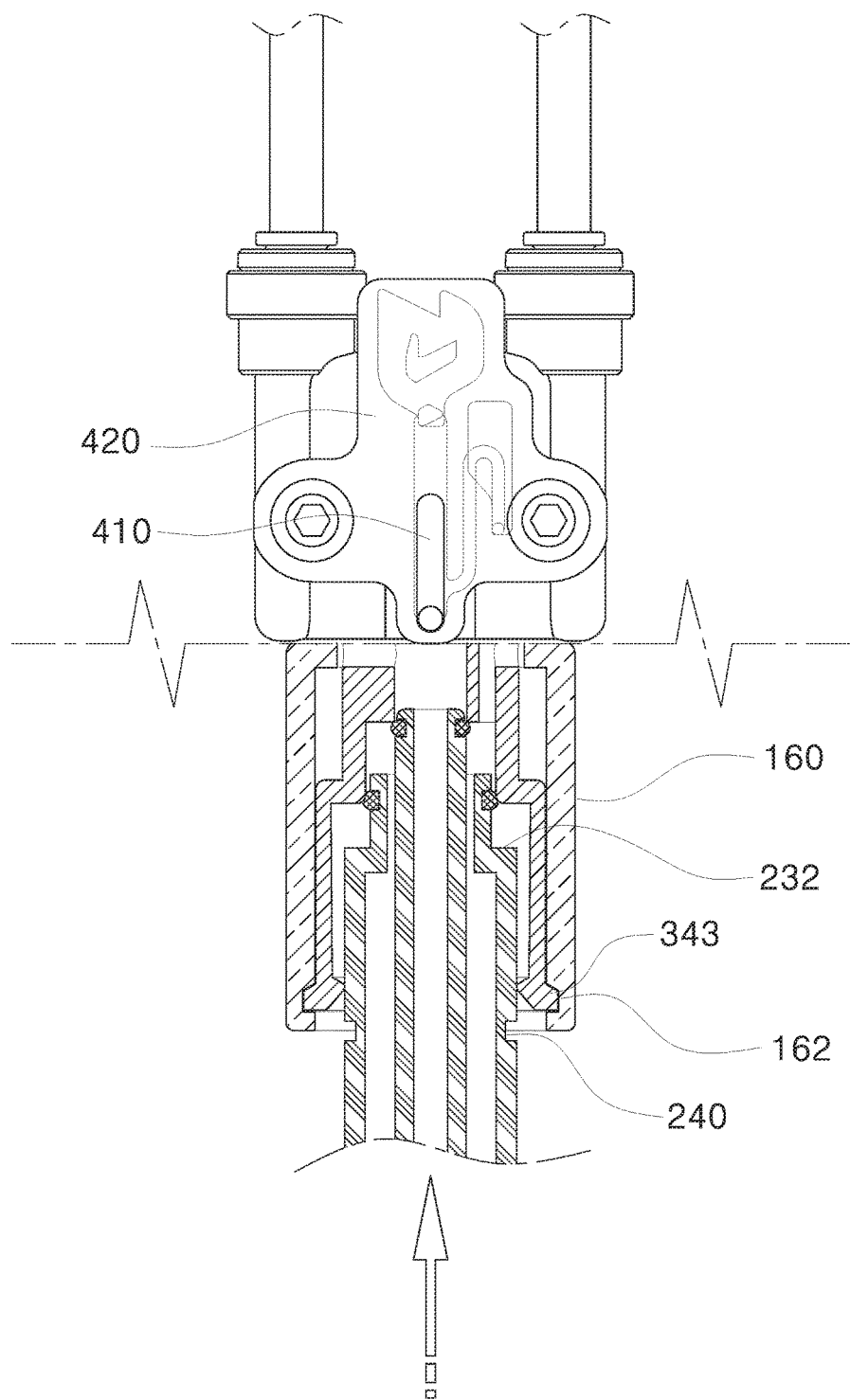
Figure 14:
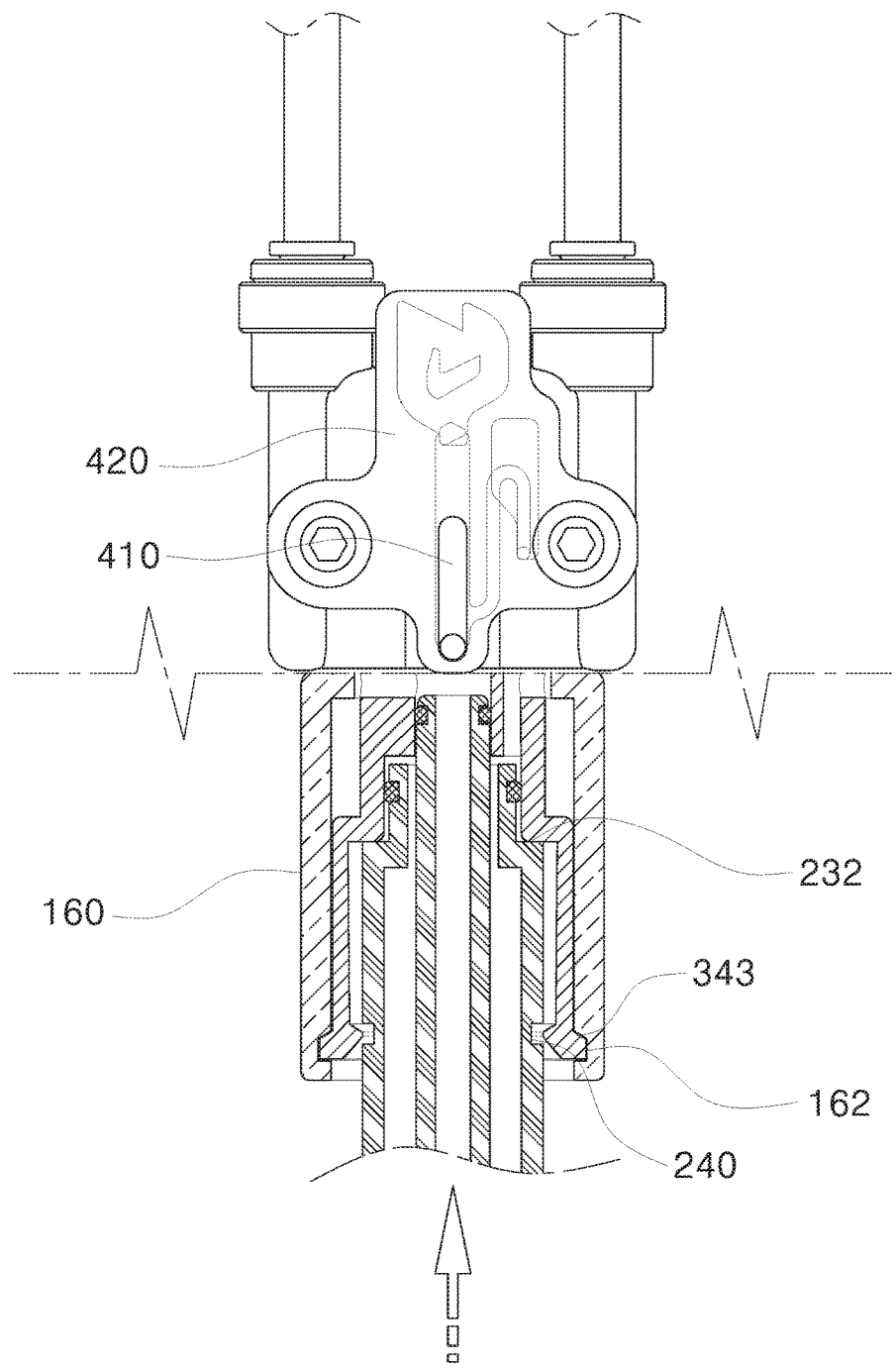
Figure 15:
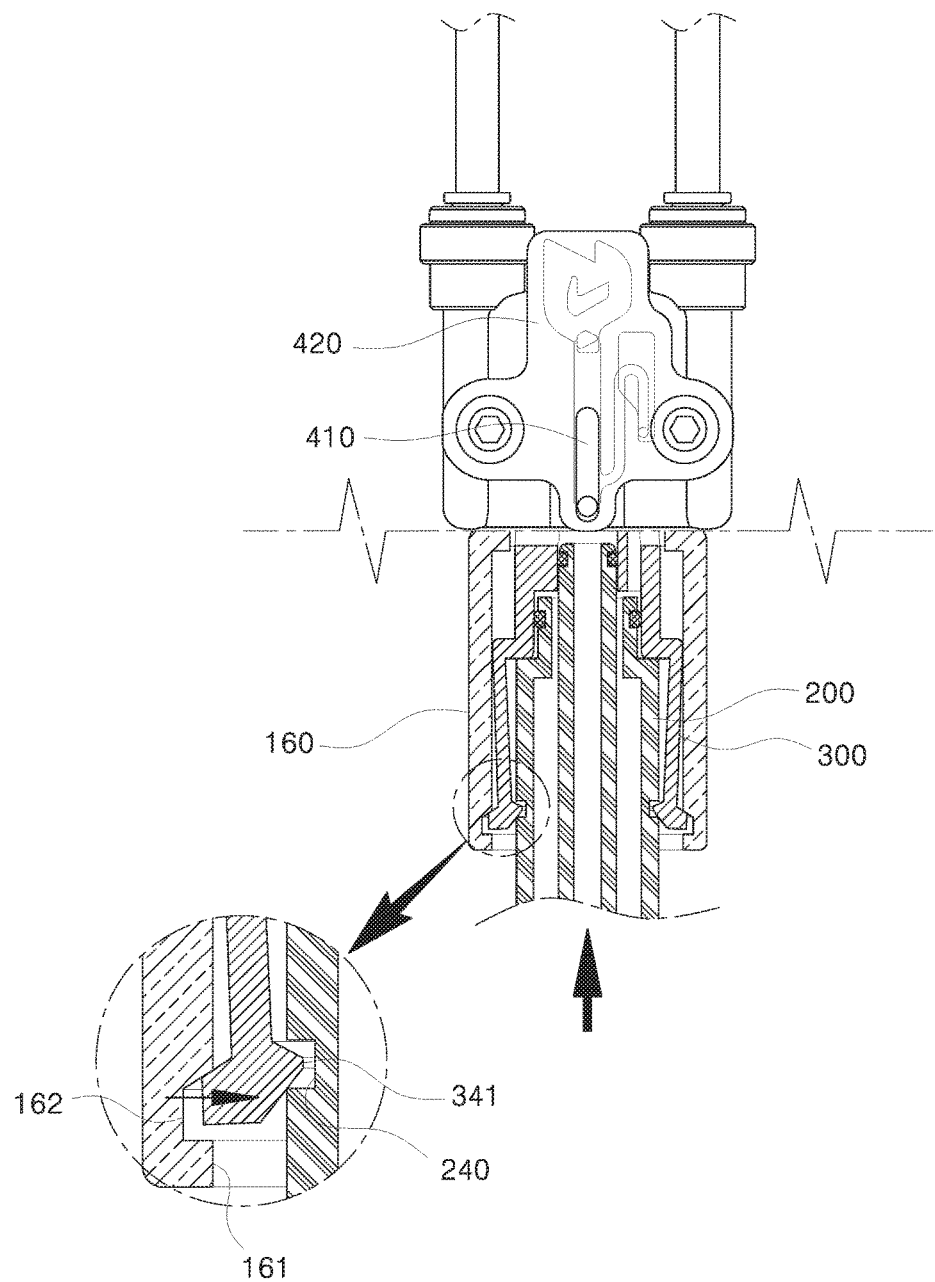
Figure 16:
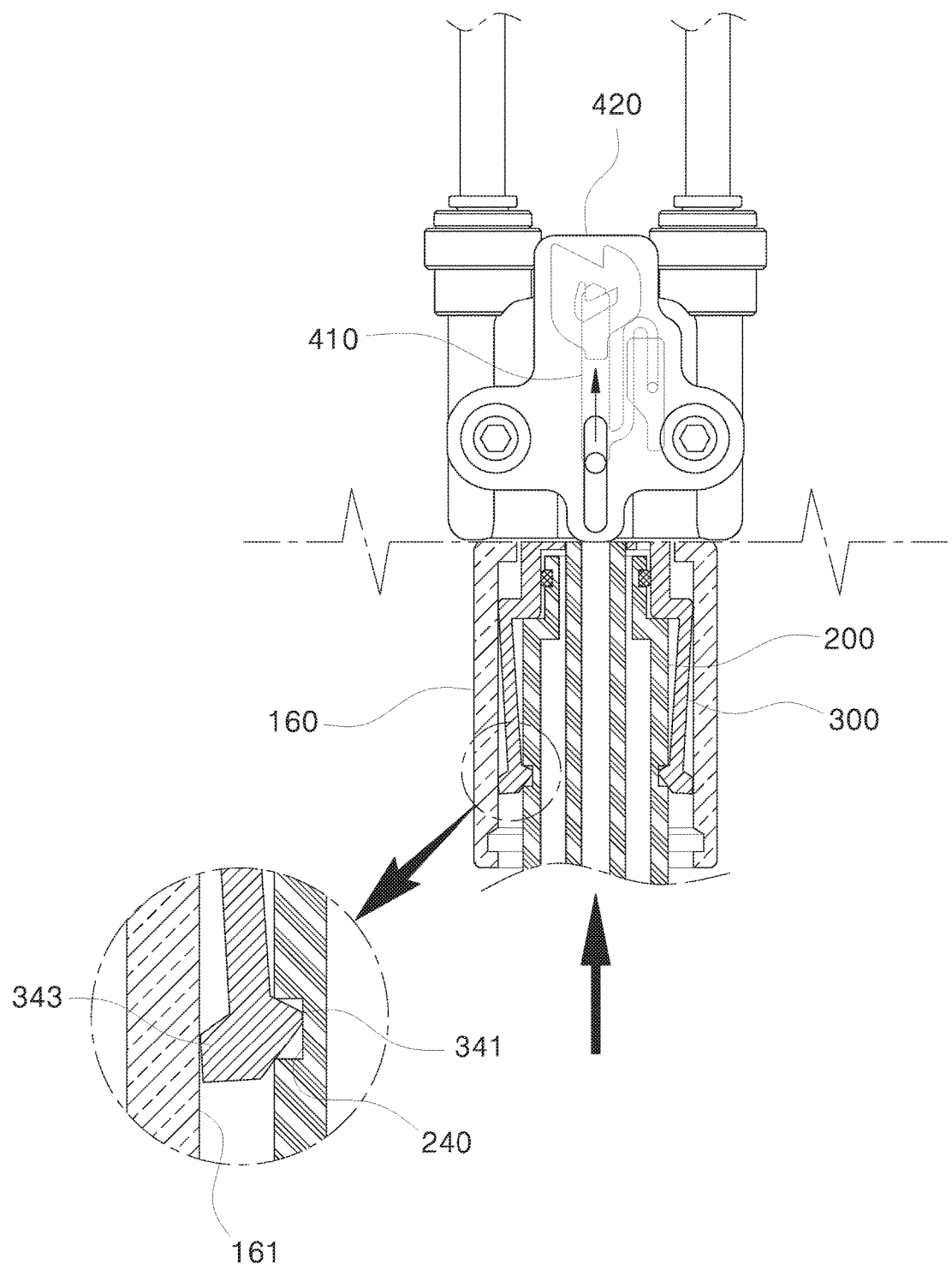
Figure 17:
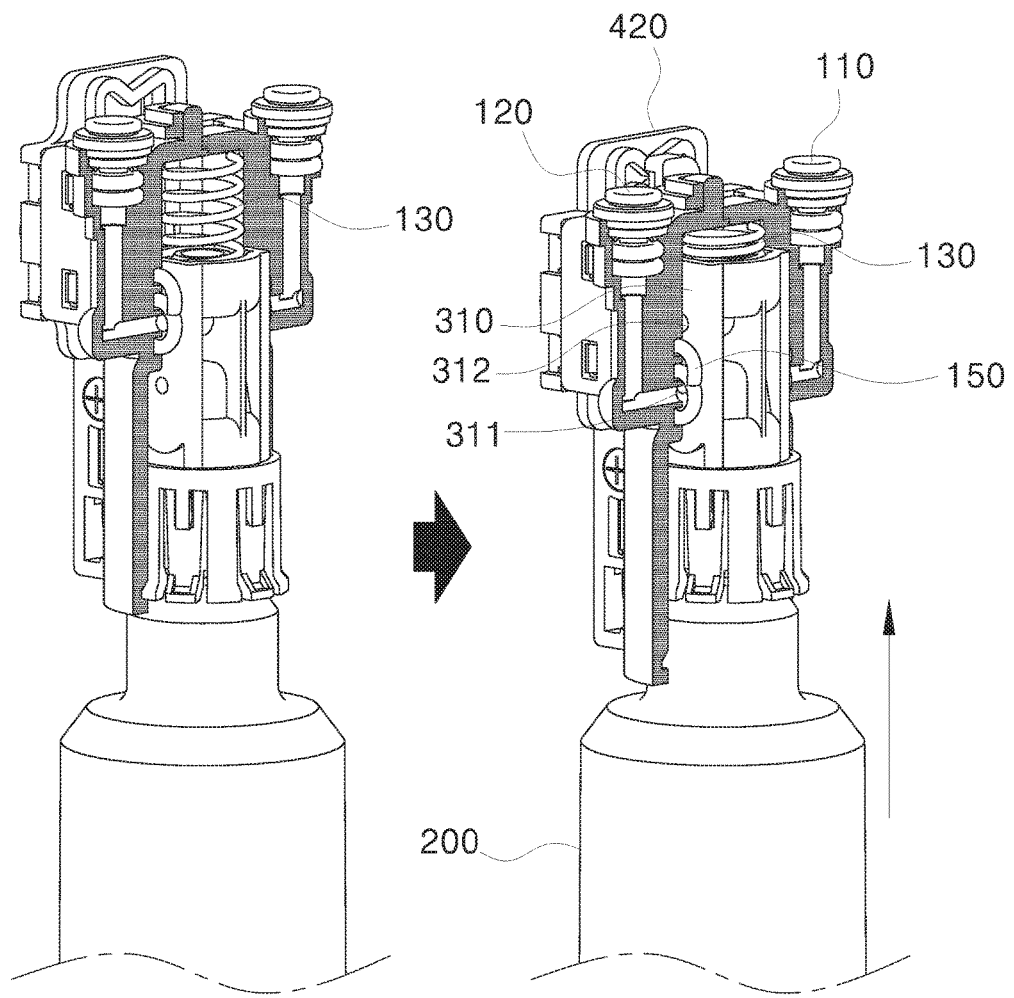
FIGS. 17 and 18 are partially sectional views illustrating an operating state of a wing member constituting the holder as the inner moves up according to the present invention.
Figure 18:
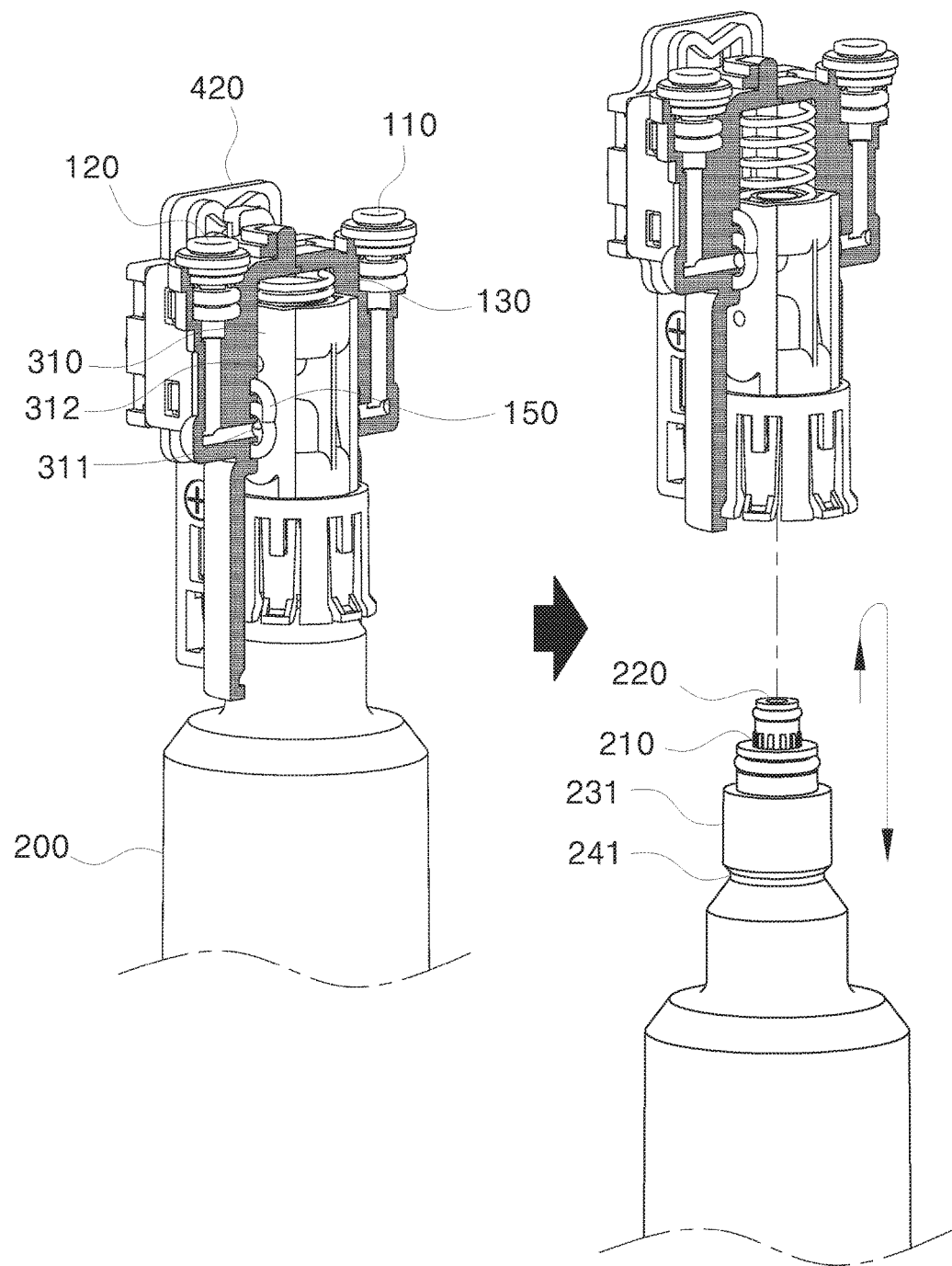
Figure 19:
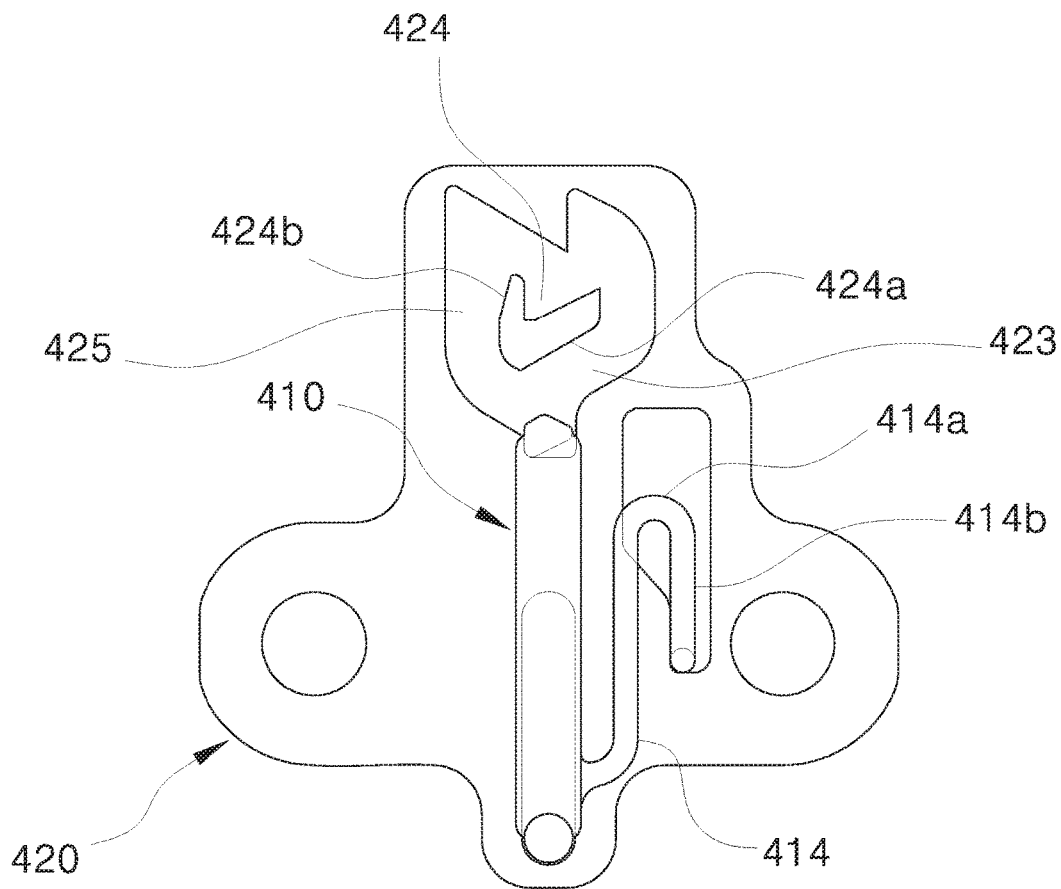
FIGS. 19 to 26 are sectional views illustrating a state that a locking/unlocking part circles along ascent or descent lines.
Figure 20:
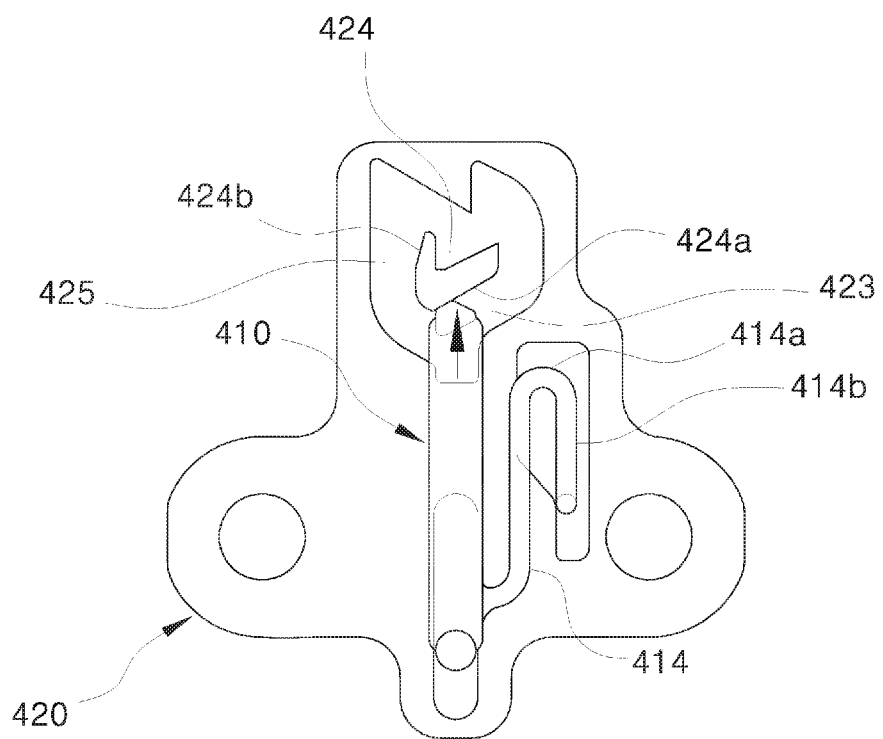
Figure 21:
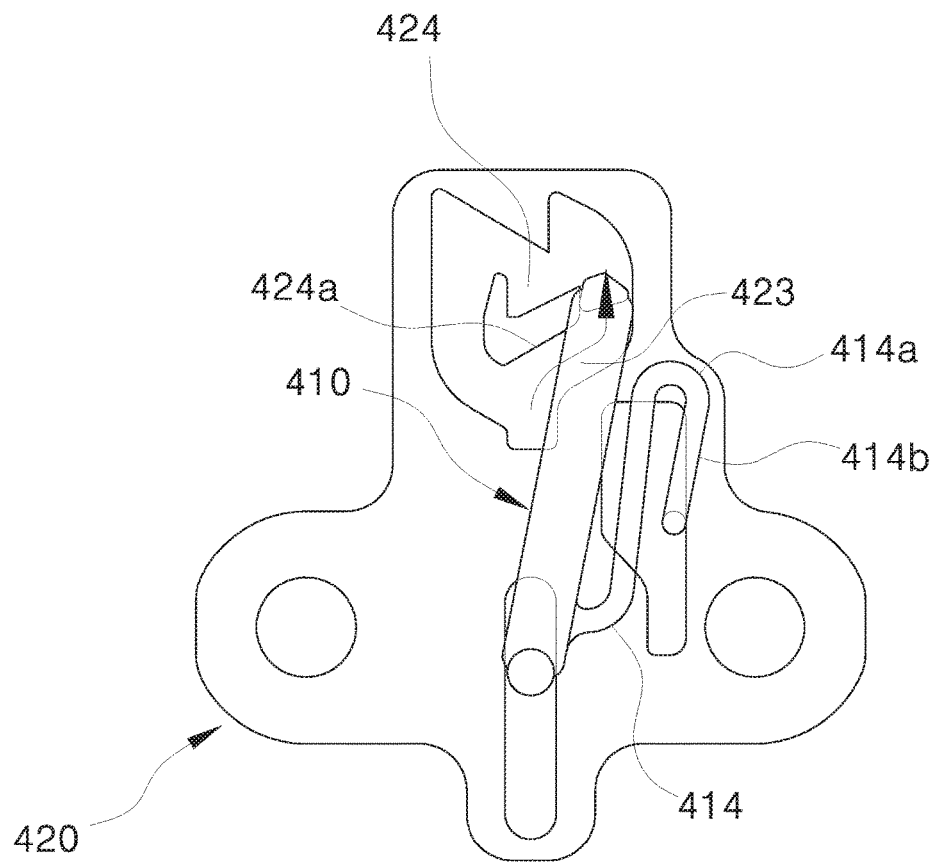
Figure 22:
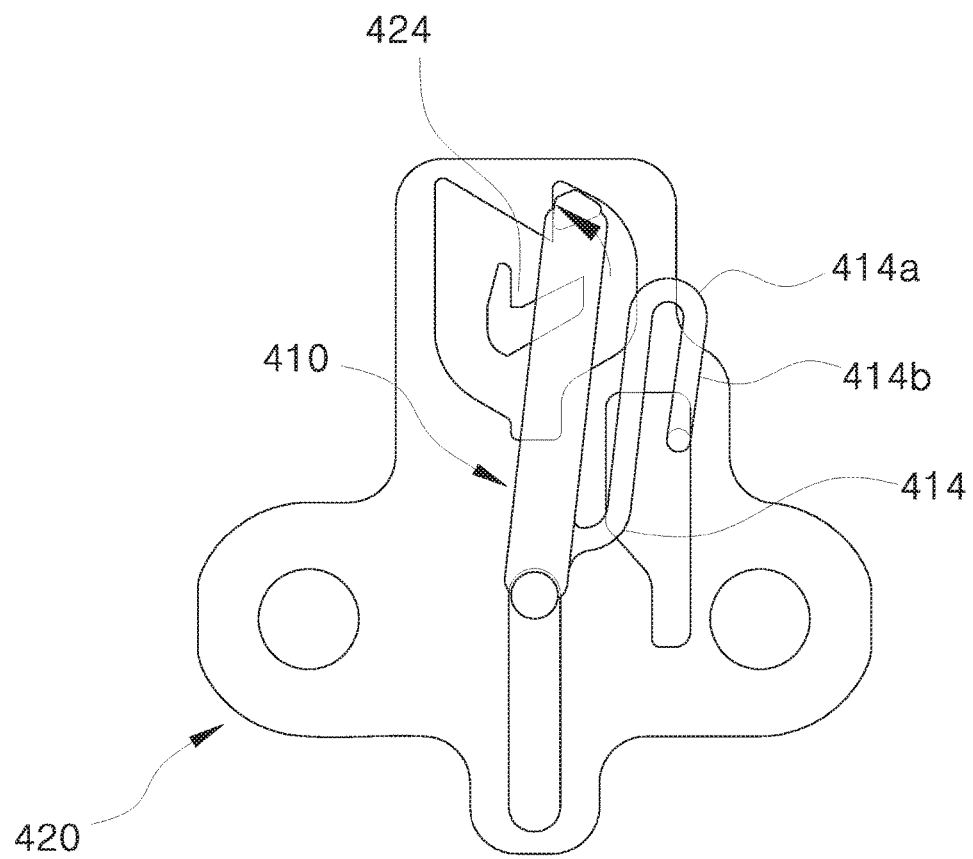
Figure 23:
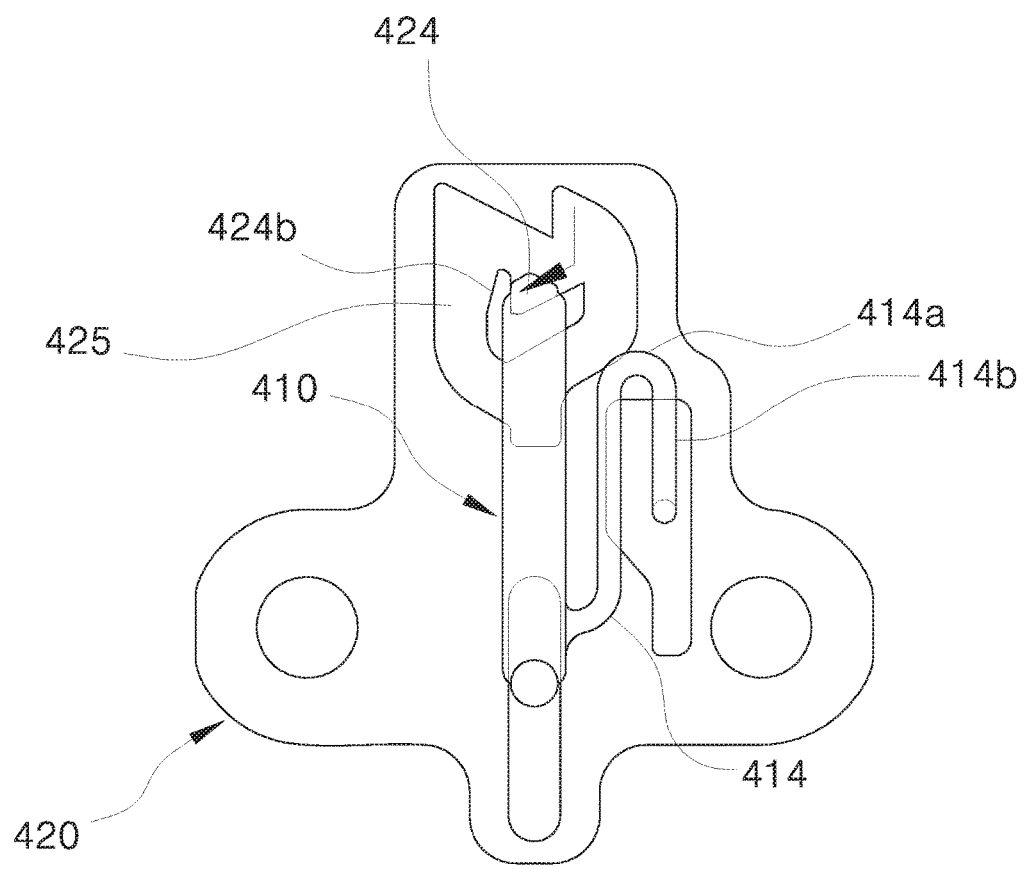
Figure 24:
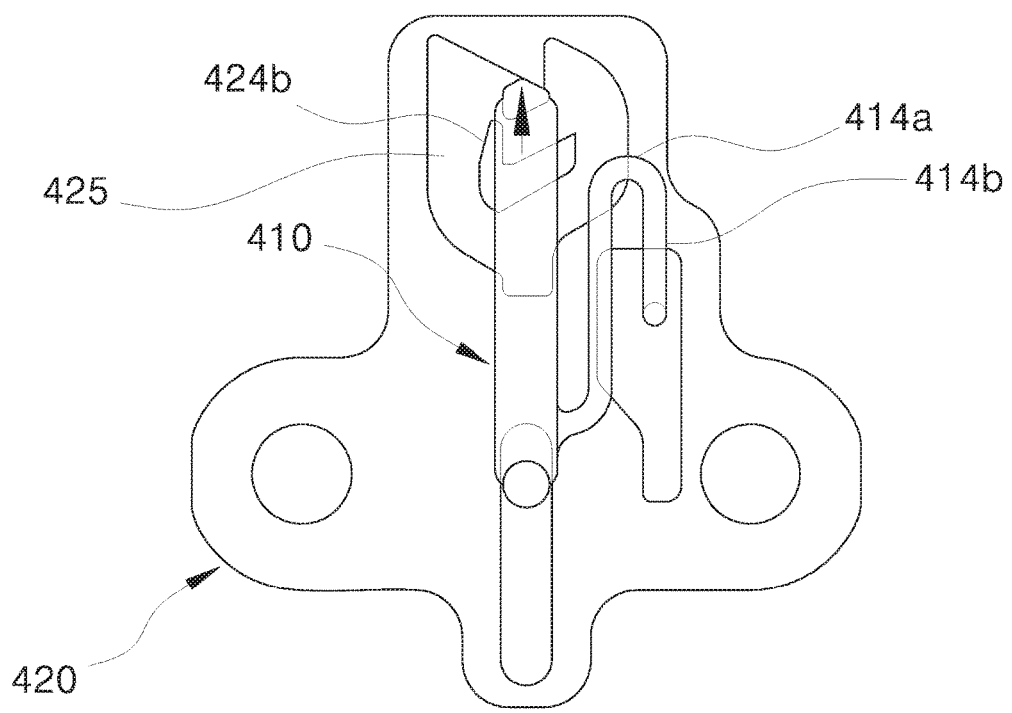
Figure 25:
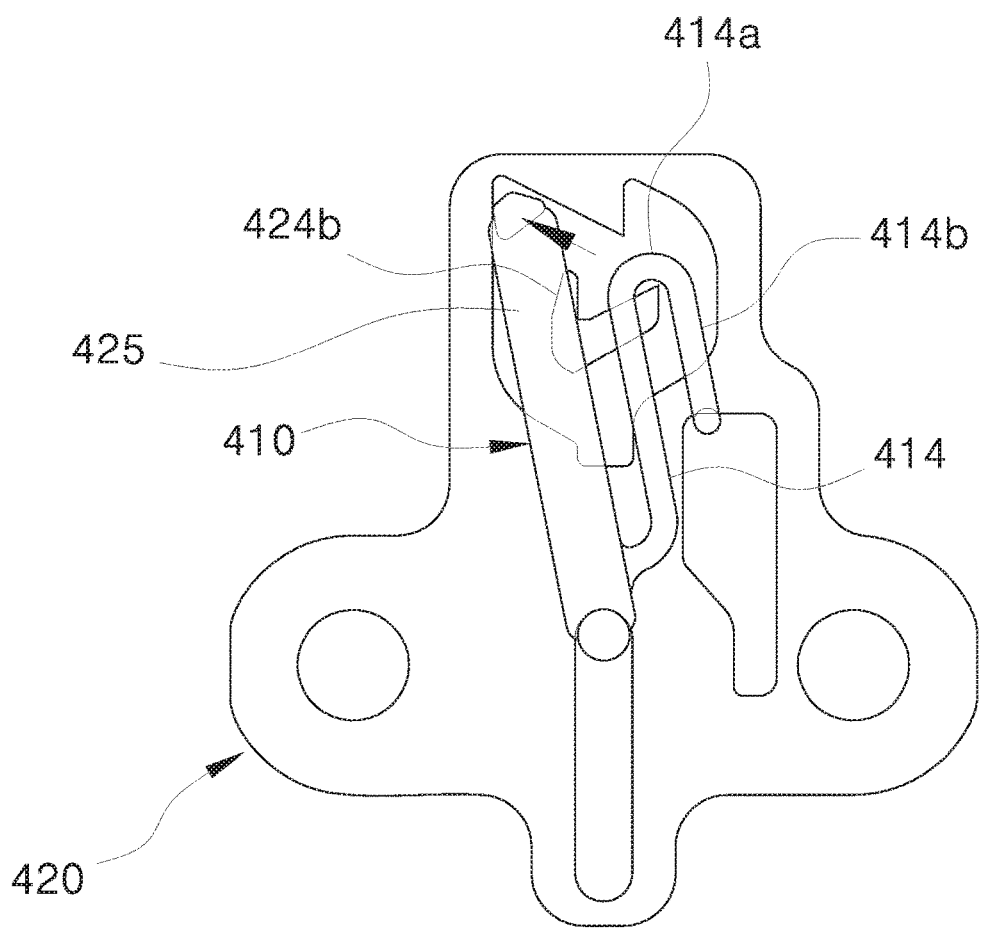
Figure 26:
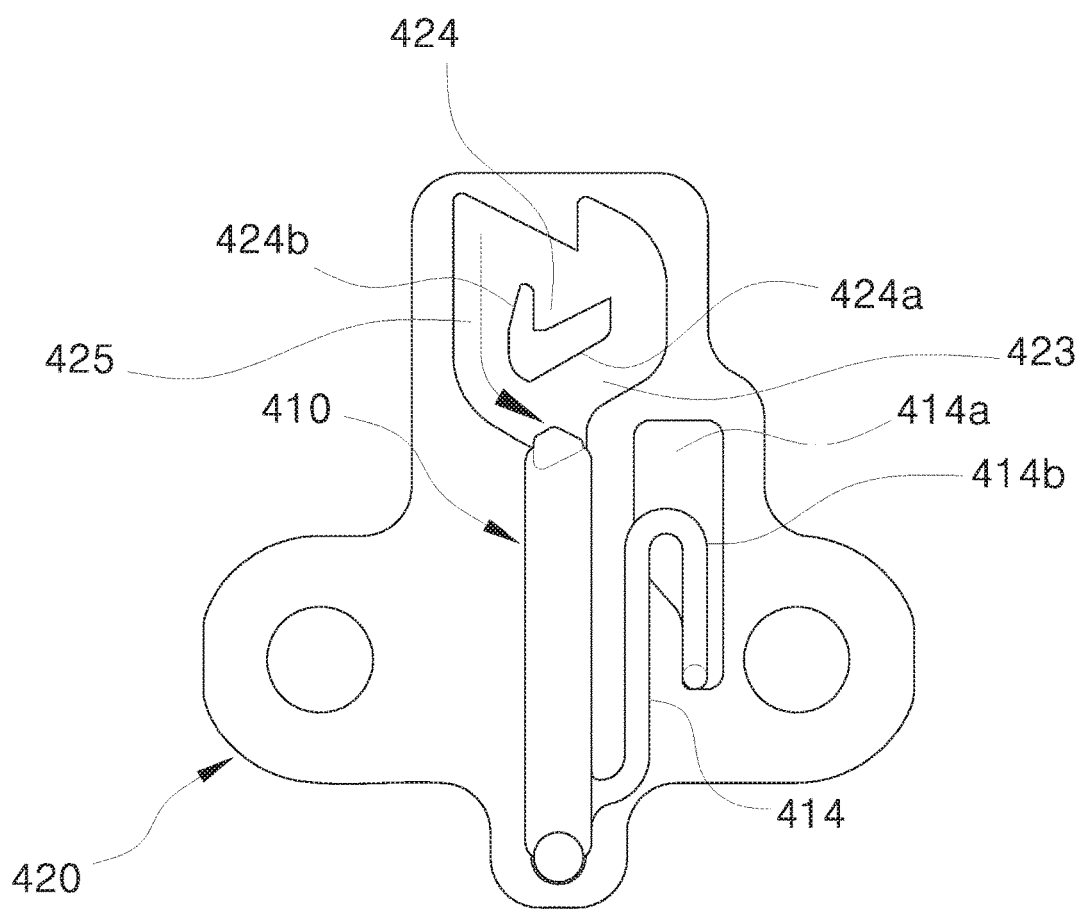

The operating principle of the operating wing piece 352 is the same as that of the holding configuration of the holder depicted in FIGS. 10 and 11.

In this case, in the state that the protrusion 343 of the wing piece 342a of the holder 340 moving up or down in the rail groove 162 moves up, the protrusion 343 is latched to the latching end 163 formed on the top end of the rail groove 162, so that the protrusion 343 is prevented from moving up anymore. Thus, the protrusion 343 performs a function of a stopper.

In addition, a step sill groove 164 may be formed on the inner wall 161 of the cap part 160 of the filter head 100, at which the operating wig piece 352 of the wing member 350 is placed, such that the protrusion 353 of the operating wing piece 352 is prevented from being introduced into the step sill groove 164 in the state the inner does not move up.

The step sill groove 164 allows the filter cartridge 200 to be easily inserted into the entrance part 320 of the inner in the state that the inner 300 does not move up. Even though the protrusion 353 of the operating wing piece 352 is placed on the lower end rim 165 of the cap part 160 of the filter head 100, the step sill groove 164 may have the same effect.

However, after the inner and the filter head are coupled to each other, as described above, the protrusion 343 of the wing piece 342a constituting the holder is inserted into the inner groove rim 163 so that the inner is prevented from being arbitrarily separated from the filter head.

In addition, the inner groove rim 163 and the protrusion have a shape such that the lower end of the inner groove rim 163 is perpendicular to the lower end of the protrusion to prevent the protrusion from being released downward from the inner groove rim and include inclined surfaces formed upward, respectively such that the protrusion is easily separated from the inner groove rim.

FIGS. 12 to 16, 17 and 18 illustrate the initiations of the locking and unlocking operations while the filter cartridge is inserted into the inner and held by the holder of the inner. Before the filter cartridge 200 is primarily pushed while the filter cartridge 200 is inserted into the entrance part 320 of the inner 300, the holder protrusion of the wing piece constituting the holder of the inner is placed at the latching element of the filter cartridge. When the pushing of the filter cartridge is initiated, the protrusion of the wing piece constituting the holder of the inner is retracted inward while being tightly closed to the inner wall of the cap part of the filter head, so that the holder protrusion is latched to the latching element of the filter cartridge.

Thus, when the pushing is initiated, the locking/unlocking part 400 is operated to prevent the filter cartridge 200 from being arbitrarily separated from the inner 300. In addition, if the inner 300 is not pushed again, the raised inner 300 does not move down.

FIGS. 19 to 26 illustrate the operation of the locking/unlocking part in sequence. As described above, the locking/unlocking part 400 includes the operating part 410 and the operation inducing part 420, where the operating part 410 is installed to the inner 300 and the operation inducing part 420 is installed to the filter head 100.

In addition, the locking/unlocking part 400 according to the present invention may be used in various manners such that the inner is allowed to be maintained in a stop state when the inner moves up and to move down when the inner is pushed again to release the stop state.

The structure described in the disclosure is proposed as a specific embodiment, and the embodiment is not limited thereto.

However, the configuration described in the disclosure may be easily implemented and the accuracy of repeating the operation may be implemented. In addition, due to the simple structure, the malfunction may be prevented.

To this end, when the inner 300 moves up, the operating part 410 installed to the inner 300 simultaneously moves up. The movable plate 411 is provided to induce exact movement. On the ascent plate 411, an ascent inducing protrusion 412 which moves up in an ascent groove 421 provided in the operation inducing part 420 and the stopping protrusion 413 for a stopping in the state that the ascent plate 411 moves up are placed just on the ascent inducing protrusion 412.

In addition, while the inner moves up by the repeated pushing of the filter cartridge, the ascent plate 411 moves up due to the primary pushing operation. At the same time, while the elastic plate 414, which induces the stop of the stopping protrusion 413 in the moving-up state and the decent due to the secondary pushing to be repeated, moves up or down with the ascent plate 411, the stopping protrusion 413 is operated.

The elastic plate 414 is placed at one side of the ascent plate 411 and has a shape b curved upward and facing downward so that the elastic plate 414 has elastic force. A front end protrusion 414a operating in an elastic plate inducing groove 422 is formed on the front end of the elastic plate 414.

In addition, the operating inducing part 420, which induces the moving-up or down when the ascent plate 411 of the operating part 410 moves up or down with the elastic plate 414, is formed in a flat shape and is installed to the filter head 100. As described above, the ascent groove 421 is provided to allow the ascent inducing protrusion 412 of the ascent plate 411 to move up or down. An elastic plate inducing groove 422 is formed at one side of the ascent groove 421 such that the elastic plate 414 moves up or down together with the ascent plate 411.

An ascent line 423 is formed just on the ascent groove 21, such that the stopping protrusion 413 moves up only in one predetermined direction when the inner 300 moves up so that the stopping protrusion 413 of the ascent plate 411 moves up. The stopping groove 424 is formed to allow the stopping protrusion 413 moved up along the ascent line 423 to be maintained in the moving-up state.

In addition, when the inner 300 is secondarily pushed in order to allow the inner 300 to move down in the stopping state after the inner 300 moves up, a decent line 425 is formed at one side of the stopping groove 424 such that the stopping protrusion 413 is released from the stopping groove 424 to return to the original position.

The elastic plate 414, which is installed at one side of the ascent plate 411 and moves up or down together with the ascent plate 411, has a shape curved a upward and facing b downward when the ascent plate 411 moves up and the stopping protrusion 413 moves up along the ascent line 423, so that the ascent plate 411 moves along the ascent line while being inclined, so the elastic plate is pressed. In the state the elastic plate is pressed, the stopping protrusion 413 continues to move up while being tightly closed to a bottom surface of a wing 424a having the stopping groove 424. Meanwhile, when the stopping protrusion 413 deviates from the upper end of the opposite surface of the wing 424a, the stopping protrusion 413 is stopped in the stopping groove due to the pressure on the elastic plate 414.

In this case, in order that the stopping protrusion deviates from the stopping groove and shifts to the decent line 425 due to the elastic force or strong pushing force, a shift protective protrusion 427 is formed downward above the stopping groove 424.

Thus, while colliding against the shift protective protrusion 427 protruding downward, the stopping protrusion 413 drops down toward the stopping groove 424 so that the stopping operation of the stop protrusion 413 is exactly maintained.

In this case, a gap between a protrusion front end of the shift protective protrusion 427 and the wing 424a forming the stopping groove forming the ascent line 423 is narrower than a thickness of the stopping protrusion 413 formed on the ascent plate 411, so that the shifting is prevented.

However, even when the shift protective protrusion does not exist, if another wing 424b forming the stopping groove is highly formed, the shifting may be prevented.

In this case, when the filter cartridge is secondarily pushed, while pressing the spring 130, the inner moves up some more. Since the stopping protrusion 413 is pressed by the elastic plate 414, in the state that the stopping protrusion 413 is safely received in the stopping groove 424, the stopping protrusion cannot shift to the ascent line 423 and directly shifts to the descent line 425.

According to the present invention, still another wing 424b of the stopping groove 424 forming the descent line 425 is formed to have an upright angle greater than the angle between the wings 424a of the ascent line 243, so that the stopping protrusion 424 is prevented from being arbitrarily separated from the stopping groove 424 and the separation is rapidly performed.

As described above, to prevent the shifting, still another wing 424b of the stopping groove 424 is formed to have a height higher than that of the front end of the wing 424a formed on the ascent line of the stopping groove, so that the stopping protrusion 424 may be prevent from directly shifting to the descent line.

In this state, when a secondary pushing occurs, while the spring which elastically operates the inner is pressed, the stopping protrusion 413 stopping in the stopping groove 424 moves up, so that the stopping protrusion 413 shifts from the stopping groove 424 to the descent line 425, thereby getting on the descent line 425.

Thereafter, the stopping protrusion 413 is placed in a standby groove 428 such that the stopping protrusion 413 is prevented from moving in the moving-down state.

In addition, when the elastic plate 414 moves up in the elastic plate inducing groove 422, the front end protrusion 414a, which is formed on the front end of the elastic plate 414, is provided from a lower end thereof to an upper end thereof with a curved surface line 422a such that the pressure is maintained. The front end protrusion 414a of the elastic plate 414 moves along the curved surface line 422a.

Thus, when the filter cartridge 200 is repeatedly pushed to separate the filter cartridge 200 so that the inner moves up, the locking/unlocking part 400 stops the inner 300 moving up. In the stopped state of the inner 400, since the filter cartridge 200 moves up, the wing piece 342 of FIG. 6 formed on the inner 300 and the holder protrusions 341 and 351 formed on the operating wing pieces 352 of FIG. 8 are latched to the latching unit 240 formed on the filter cartridge 200, so that the filter cartridge 200 is prevented from being arbitrarily separated from the filter head 100 in the state that the filter cartridge 200 is installed to the filter head 100. In this state, the water purification line 1 is connected to purify water and then, if pushed again, the inner moves down after moving up somewhat and the stopping protrusion 413 of the locking/unlocking part 400 is separated from the stopping groove 424, so that the inner 300 moves down.

As described above, when the inner 300 moves down, while the wing piece 342 or the operating wing piece 352 constituting the holder 340 formed on the inner 300 moves down, the he wing piece 342 or the operating wing piece 352 is placed in the inner groove rim 241 of the filter head 100, the step sill groove 164 or the lower end rim. When the inner 300 moves up, the pressure on the holder protrusions 341 and 351 are removed by the inner wall 161 of the cap part 160 of the filter head 100, so that the holder protrusions 341 and 351, which are latched to the latching element 240 of the filter cartridge 200, return to the original positions, thereby separating the filter cartridge 200 from the filter head 100.

In this case, while the inner 300 moves down, the water purification passage 1 switches to the bypass passage 2 so that a leakage is prevented.

What is claimed is:

1. A filter cartridge assembly comprising:
a filter head having an inlet and an outlet;
an inner structure moving up or down in the filter head by an elastic unit; and
a locking/unlocking part to control the inner structure to be stopped in a state that the inner structure moves up and to move down in state that the inner structure is stopped such that a filter cartridge is detachably installed in the filter head through the up-down movement of the inner, wherein, in order to allow the inner structure, which moves up or down in the filter head, to linearly move up only to separate the filter cartridge and to prevent the filter cartridge from being arbitrarily separated when the inner structure moves down,
wherein the inner structure comprises:
an inner main body, and
a holder including a plurality of wing pieces, in which the holder formed on a lower end of the inner main body is provided with the wing pieces, which are spaced apart from each other to operate inward and outward, respectively, when the inner structure moves up or down,
wherein each of the wing pieces comprises:
a protrusion for inducing the inner structure to be retracted inward while tightly making contact with an inner wall of the filter head when the inner structure moves up, and
a holder protrusion formed at an opposite side of the protrusion to hold the filter cartridge, and
wherein the protrusion of the wing piece releases an operation of the holder protrusion holding the filter cartridge in a state that the inner structure moves down, and the filter head is provided with an inner groove rim on a portion at which the protrusion is placed in the state that the inner structure moves down such that the protrusion is inserted into the inner groove rim to be latched to the inner groove rim, thereby preventing the inner structure from being arbitrarily separated from the filter head.

2. The filter cartridge assembly of claim 1, further comprising:
a latching rim provided as an engaging element on a lower end of a front end of the filter cartridge in which the inlet and the outlet are coaxially formed,
wherein the latching rim is provided on a part at which the holder protrusion is placed in a state that the filter cartridge moves up such that the holder protrusion of the wing piece, which retracts inward when the inner structure moves up, is firmly latched to the latch rim.

3. The filter cartridge assembly of claim 1, wherein the protrusion and the holder protrusion are formed corresponding to each other at an outside and an inside of each of the wing pieces of the holder, respectively, the wing pieces being spaced apart from each other.

4. The filter cartridge assembly of claim 2, wherein the protrusion and the holder protrusion are formed corresponding to each other at an outside and an inside of each of the wing pieces of the holder, respectively, the wing pieces being spaced apart from each other.

5. A filter cartridge assembly comprising:
a filter head having an inlet and an outlet;
an inner structure moving up or down in the filter head by an elastic unit; and
a locking/unlocking part to control the inner structure to be stopped in a state that the inner structure moves up and to move down in state that the inner structure is stopped such that a filter cartridge is detachably installed in the filter head through the up-down movement of the inner structure,
wherein, in order to allow the inner structure, which moves up or down in the filter head, to linearly move up only to separate the filter cartridge and to prevent the filter cartridge from being arbitrarily separated when the inner structure moves down while improving an injection molding property,
wherein the inner structure comprises:
an inner main body including a holder having at least two wing pieces spaced apart from each other to separate the filter cartridge only when the inner structure vertically moves up or down, and
a wing member assembled to the wing piece of the holder,
wherein the wing member comprises:
a latching wing piece coupled to the wing piece of the holder, and
an operating wing piece placed at an opening part formed between the wing pieces of the inner main body,
wherein the latching wing piece is provided with a latching hook engaged with a latching groove of the wing piece of the inner main body, and
wherein a protrusion is formed at an outer portion of the operating wing piece to allow the operating wing piece to be retracted while tightly making contact with an inner wall of the filter head when moving up, and a latching unit is formed at an inner portion of the operating wing piece to allow the operating wing piece to be latched to a latching rim serving as an engaging element of the filter cartridge.

6. The filter cartridge assembly of claim 5, wherein the wing piece constituting the holder is provided at an outer portion thereof with a protrusion and a rail groove is formed in an inner wall of the filter head along which the protrusion moves up or down, such that the wing piece of the holder is prevented from operating.

7. The filter cartridge assembly of claim 5, further comprising:
a latching rim provided as an engagement element,
wherein the latching rim is formed on a lower end of a contact surface of a front end of the filter cartridge such that the filter has no specific directionality when coupled to the filter head.

8. The filter cartridge assembly of claim 1,
wherein the locking/unlocking part includes an operation inducing part installed to the filter head and an operating part installed to the inner structure,
wherein the operating part includes a movable member and is coupled into an inserting groove formed in the inner structure through an inserting protrusion formed at one side of the operating part and a stopping protrusion is provided at an upper side of the movable member, and
wherein the operation inducing part engaged with the operating part includes an ascent line and a descent line to allow the stopping protrusion of the operating part to be circulated, and a stopping groove provided at a central part of the operation inducing part.

9. The filter cartridge assembly of claim 5,
wherein the locking/unlocking part includes an operation inducing part installed to the filter head and an operating part installed to the inner structure,
wherein the operating part includes a movable member and is coupled into an inserting groove formed in the inner structure through an inserting protrusion formed at one side of the operating part and a stopping protrusion is provided at an upper side of the movable member, and
wherein the operation inducing part engaged with the operating part includes an ascent line and a descent line to allow the stopping protrusion of the operating part to be circulated, and a stopping groove provided at a central part of the operation inducing part.

10. The filter cartridge assembly of claim 1,
wherein the filter head is divided into two equal parts to easily assemble the inner structure, and
wherein the two equal parts are assembled with each other by using a coupling unit in a state that the inner structure is interposed between the two equal parts.

11. The filter cartridge assembly of claim 5,
wherein the filter head is divided into two equal parts to easily assemble the inner structure, and
wherein the two equal parts are assembled with each other by using a coupling unit in a state that the inner structure is interposed between the two equal parts.

12. The filter cartridge assembly of claim 1,
wherein the inner groove rim and the protrusion are configured to allow a lower end of the inner groove rim or a lower end of the protrusion to be perpendicular to the inner wall, thereby preventing the protrusion from being released downward from the inner groove rim, and
wherein inclined surfaces are formed at upper portions of the inner groove rim and the protrusion, respectively, such that the protrusion is easily separated from the inner groove rim.

13. The filter cartridge assembly of claim 5,
wherein the inner groove rim and the protrusion are configured to allow a lower end of the inner groove rim or a lower end of the protrusion to be perpendicular to the inner wall, thereby preventing the protrusion from being released downward from the inner groove rim, and
wherein inclined surfaces are formed at upper portions of the inner groove rim and the protrusion, respectively, such that the protrusion is easily separated from the inner groove rim.

* * * * *